(12) United States Patent
Conrad et al.

(10) Patent No.: US 9,100,685 B2
(45) Date of Patent: Aug. 4, 2015

(54) DETERMINING AUDIENCE STATE OR INTEREST USING PASSIVE SENSOR DATA

(75) Inventors: Michael J. Conrad, Monroe, WA (US);
Geoffrey J Hulten, Lynnwood, WA (US); Kyle J. Krum, Sammamish, WA (US); Umaimah A. Mendhro, San Francisco, CA (US); Darren B. Remington, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/316,351

(22) Filed: Dec. 9, 2011

(65) Prior Publication Data

US 2013/0152113 A1 Jun. 13, 2013

(51) Int. Cl.
H04N 21/422 (2011.01)
H04N 21/442 (2011.01)
H04N 21/4223 (2011.01)
H04N 21/466 (2011.01)

(52) U.S. Cl.
CPC ..... *H04N 21/42201* (2013.01); *H04N 21/4223* (2013.01); *H04N 21/42203* (2013.01); *H04N 21/44213* (2013.01); *H04N 21/44218* (2013.01); *H04N 21/4667* (2013.01)

(58) Field of Classification Search
CPC .......... H04N 21/258; H04N 21/42201; H04N 21/42203; H04N 21/4223; H04N 21/44213; H04N 21/44218; H04N 21/4667
USPC ................................. 725/9–10, 12
See application file for complete search history.

(56) References Cited

U.S. PATENT DOCUMENTS

| | | | |
|---|---|---|---|
| 4,288,078 A | 9/1981 | Lugo | |
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |

(Continued)

FOREIGN PATENT DOCUMENTS

| | | |
|---|---|---|
| CA | 2775700 | 7/2012 |
| CA | 2775814 | 9/2013 |

(Continued)

OTHER PUBLICATIONS

Tep, et al., "Web Site Quality Evaluation Combining Eyetracking and Physiologicial Measures to Self-Reported Emotions: An Exploratory Research", Retrieved at <<http://www.noldus.com/mb2008/individual_papers/FPS_eye _tracking/FPS_eye_tracking_Prom-Tep.pdf>>, Proceedings of Measuring Behavior, Aug. 26-29, 2008, pp. 242-225.

(Continued)

*Primary Examiner* — Randy Flynn
(74) *Attorney, Agent, or Firm* — Nicholas Chen; Kate Drakos; Micky Minhas

(57) ABSTRACT

This document describes techniques and apparatuses for determining an audience's state or interest using passive sensor data. The techniques receive sensor data that measures an audience during presentation of a media program. The techniques, based on this sensor data, then determine a state or interest of the audience members during the media program.

20 Claims, 6 Drawing Sheets

(56) References Cited

U.S. PATENT DOCUMENTS

| | | |
|---|---|---|
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 4,931,865 A | 6/1990 | Scarampi |
| 5,101,444 A | 3/1992 | Wilson et al. |
| 5,148,154 A | 9/1992 | MacKay et al. |
| 5,175,641 A | 12/1992 | Boerstler et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,528,263 A | 6/1996 | Platzker et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,276 A | 12/1996 | Cipolla et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,801,704 A | 9/1998 | Oohara et al. |
| 5,805,167 A | 9/1998 | van Cruyningen |
| 5,828,779 A | 10/1998 | Maggioni |
| 5,875,108 A | 2/1999 | Hoffberg et al. |
| 5,877,503 A | 3/1999 | Neriishi |
| 5,877,803 A | 3/1999 | Wee et al. |
| 5,904,484 A | 5/1999 | Burns |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 5,999,766 A | 12/1999 | Hisatomi et al. |
| 6,002,808 A | 12/1999 | Freeman |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,111,580 A | 8/2000 | Kazama et al. |
| 6,115,482 A | 9/2000 | Sears |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,181,472 B1 | 1/2001 | Liu |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,291,816 B1 | 9/2001 | Liu |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,514,081 B1 | 2/2003 | Mengoli |
| 6,525,827 B2 | 2/2003 | Liu |
| 6,539,931 B2 | 4/2003 | Trajkovic et al. |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,615,177 B1 | 9/2003 | Rapp et al. |
| 6,622,119 B1 | 9/2003 | Ramaswamy et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,730,913 B2 | 5/2004 | Remillard et al. |
| 6,731,799 B1 | 5/2004 | Sun et al. |
| 6,738,066 B1 | 5/2004 | Nguyen |
| 6,750,848 B1 | 6/2004 | Pryor |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Selley et al. |
| 6,868,383 B1 | 3/2005 | Bangalore et al. |
| 6,873,723 B1 | 3/2005 | Aucsmith et al. |
| 6,876,496 B2 | 4/2005 | French et al. |
| 6,881,526 B2 | 4/2005 | Bobeck et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,007,236 B2 | 2/2006 | Dempski et al. |
| 7,028,001 B1 | 4/2006 | Muthuswamy et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,042,442 B1 | 5/2006 | Kanevsky et al. |
| 7,050,177 B2 | 5/2006 | Tomasi et al. |
| 7,050,606 B2 | 5/2006 | Paul et al. |

(56) References Cited

U.S. PATENT DOCUMENTS

| | | |
|---|---|---|
| 7,058,204 B2 | 6/2006 | Hildreth et al. |
| 7,060,957 B2 | 6/2006 | Lange et al. |
| 7,096,454 B2 | 8/2006 | Damm et al. |
| 7,113,918 B1 | 9/2006 | Ahmad et al. |
| 7,120,880 B1 * | 10/2006 | Dryer et al. .................. 715/863 |
| 7,121,946 B2 | 10/2006 | Paul et al. |
| 7,134,130 B1 | 11/2006 | Thomas |
| 7,145,330 B2 | 12/2006 | Xiao |
| 7,151,530 B2 | 12/2006 | Roeber et al. |
| 7,155,305 B2 | 12/2006 | Hayes et al. |
| 7,162,082 B2 | 1/2007 | Edwards |
| 7,170,492 B2 | 1/2007 | Bell |
| 7,170,605 B2 | 1/2007 | Cromwell et al. |
| 7,184,048 B2 | 2/2007 | Hunter |
| 7,202,898 B1 | 4/2007 | Braun et al. |
| 7,212,665 B2 | 5/2007 | Yang et al. |
| 7,214,932 B2 | 5/2007 | Brunfeld et al. |
| 7,217,020 B2 | 5/2007 | Finch |
| 7,222,078 B2 | 5/2007 | Abelow |
| 7,224,384 B1 | 5/2007 | Iddan et al. |
| 7,227,526 B2 | 6/2007 | Hildreth et al. |
| 7,246,329 B1 | 7/2007 | Miura et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,435,941 B2 | 10/2008 | Ayres |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,487,375 B2 | 2/2009 | Lourie et al. |
| 7,489,812 B2 | 2/2009 | Fox et al. |
| 7,512,889 B2 | 3/2009 | Newell et al. |
| 7,536,032 B2 | 5/2009 | Bell |
| 7,538,782 B2 | 5/2009 | Kuroki et al. |
| 7,555,142 B2 | 6/2009 | Hildreth et al. |
| 7,559,841 B2 | 7/2009 | Hashimoto |
| 7,560,701 B2 | 7/2009 | Oggier et al. |
| 7,568,116 B2 | 7/2009 | Dooley et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,636,456 B2 * | 12/2009 | Collins et al. .................. 725/12 |
| 7,640,304 B1 | 12/2009 | Goldscheider |
| 7,643,056 B2 | 1/2010 | Silsby |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,739,140 B2 | 6/2010 | Vinson et al. |
| 7,746,345 B2 | 6/2010 | Hunter |
| 7,752,633 B1 | 7/2010 | Fleming |
| 7,760,182 B2 | 7/2010 | Ahmad et al. |
| 7,762,665 B2 | 7/2010 | Vertegaal et al. |
| 7,764,311 B2 | 7/2010 | Bill |
| 7,770,136 B2 | 8/2010 | Beeck et al. |
| 7,809,167 B2 | 10/2010 | Bell |
| 7,814,518 B2 | 10/2010 | Ducheneaut et al. |
| 7,834,846 B1 | 11/2010 | Bell |
| 7,836,480 B1 | 11/2010 | Harvey et al. |
| 7,852,262 B2 | 12/2010 | Namineni et al. |
| 7,889,073 B2 | 2/2011 | Zalewski |
| 7,895,076 B2 | 2/2011 | Kutaragi et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,081,302 B2 | 12/2011 | Paluszek et al. |
| 8,096,660 B2 | 1/2012 | Vertegaal et al. |
| 8,102,422 B1 | 1/2012 | Kenderov et al. |
| 8,132,187 B2 | 3/2012 | Klyuchevskyy |
| 8,141,775 B1 | 3/2012 | Aidasani et al. |
| 8,189,053 B2 | 5/2012 | Pryor |
| 8,260,740 B2 | 9/2012 | Davis et al. |
| 8,322,856 B2 | 12/2012 | Vertegaal et al. |
| 8,327,395 B2 | 12/2012 | Lee et al. |
| 8,332,883 B2 | 12/2012 | Lee et al. |
| 8,418,085 B2 | 4/2013 | Snook et al. |
| 8,471,868 B1 | 6/2013 | Wilson et al. |
| 8,499,245 B1 | 7/2013 | Froment et al. |
| 8,522,289 B2 | 8/2013 | Athsani et al. |
| 8,620,113 B2 | 12/2013 | Yee |
| 8,635,637 B2 | 1/2014 | Krum |
| 8,660,303 B2 | 2/2014 | Izadi et al. |
| 8,760,395 B2 | 6/2014 | Kim et al. |
| 8,898,687 B2 | 11/2014 | Hulten et al. |
| 8,943,526 B2 | 1/2015 | Rivera et al. |
| 8,959,541 B2 | 2/2015 | Conrad et al. |
| 2001/0021994 A1 | 9/2001 | Nash |
| 2002/0041327 A1 | 4/2002 | Hildreth et al. |
| 2002/0072952 A1 | 6/2002 | Hamzy et al. |
| 2002/0073417 A1 * | 6/2002 | Kondo et al. .................. 725/10 |
| 2002/0108000 A1 | 8/2002 | Iori et al. |
| 2002/0120925 A1 | 8/2002 | Logan |
| 2002/0144259 A1 | 10/2002 | Gutta et al. |
| 2002/0157095 A1 | 10/2002 | Masumitsu et al. |
| 2002/0174230 A1 | 11/2002 | Gudorf et al. |
| 2002/0174445 A1 | 11/2002 | Miller et al. |
| 2002/0178446 A1 | 11/2002 | Sie et al. |
| 2003/0001846 A1 | 1/2003 | Davis et al. |
| 2003/0005439 A1 | 1/2003 | Rovira |
| 2003/0007018 A1 | 1/2003 | Seni et al. |
| 2003/0033600 A1 | 2/2003 | Cliff et al. |
| 2003/0066071 A1 | 4/2003 | Gutta et al. |
| 2003/0074661 A1 | 4/2003 | Krapf et al. |
| 2003/0093784 A1 * | 5/2003 | Dimitrova et al. .............. 725/12 |
| 2003/0112467 A1 | 6/2003 | McCollum et al. |
| 2003/0118974 A1 | 6/2003 | Obrador |
| 2003/0126593 A1 | 7/2003 | Mault |
| 2003/0141360 A1 | 7/2003 | De Leo et al. |
| 2003/0167358 A1 | 9/2003 | Marvin et al. |
| 2004/0001616 A1 | 1/2004 | Gutta et al. |
| 2004/0046736 A1 | 3/2004 | Pryor et al. |
| 2004/0056907 A1 | 3/2004 | Sharma et al. |
| 2004/0068409 A1 | 4/2004 | Tanaka et al. |
| 2004/0070573 A1 | 4/2004 | Graham |
| 2004/0113933 A1 | 6/2004 | Guler |
| 2004/0155962 A1 | 8/2004 | Marks |
| 2004/0168190 A1 | 8/2004 | Saari et al. |
| 2004/0189720 A1 | 9/2004 | Wilson et al. |
| 2004/0193413 A1 | 9/2004 | Wilson et al. |
| 2004/0196309 A1 | 10/2004 | Hawkins |
| 2004/0207597 A1 | 10/2004 | Marks |
| 2005/0010637 A1 | 1/2005 | Dempski et al. |
| 2005/0022239 A1 | 1/2005 | Meuleman |
| 2005/0059488 A1 | 3/2005 | Larsen et al. |
| 2005/0076365 A1 | 4/2005 | Popov et al. |
| 2005/0082480 A1 | 4/2005 | Wagner et al. |
| 2005/0190973 A1 | 9/2005 | Kristensson et al. |

(56) References Cited

U.S. PATENT DOCUMENTS

| | | |
|---|---|---|
| 2005/0212767 A1 | 9/2005 | Marvit et al. |
| 2005/0212911 A1 | 9/2005 | Marvit |
| 2005/0215319 A1 | 9/2005 | Rigopulos et al. |
| 2005/0223237 A1 | 10/2005 | Barletta et al. |
| 2005/0229116 A1 | 10/2005 | Endler et al. |
| 2005/0229199 A1 | 10/2005 | Yabe |
| 2005/0234998 A1 | 10/2005 | Lesandrini et al. |
| 2005/0257166 A1 | 11/2005 | Tu |
| 2005/0289582 A1 | 12/2005 | Tavares et al. |
| 2006/0020904 A1 | 1/2006 | Aaltonen |
| 2006/0031776 A1 | 2/2006 | Glein et al. |
| 2006/0031786 A1 | 2/2006 | Hillis et al. |
| 2006/0055685 A1 | 3/2006 | Rimas-Ribikauskas |
| 2006/0073816 A1 | 4/2006 | Kim et al. |
| 2006/0101349 A1 | 5/2006 | Lieberman et al. |
| 2006/0123360 A1 | 6/2006 | Anwar et al. |
| 2006/0158307 A1 | 7/2006 | Lee et al. |
| 2006/0174313 A1 | 8/2006 | Ducheneaut et al. |
| 2006/0184800 A1 | 8/2006 | Rosenberg |
| 2006/0188144 A1 | 8/2006 | Sasaki et al. |
| 2006/0188234 A1 | 8/2006 | Takeshita |
| 2006/0200780 A1 | 9/2006 | Iwema et al. |
| 2006/0210958 A1 | 9/2006 | Rimas-Ribikauskas |
| 2006/0218573 A1 | 9/2006 | Proebstel |
| 2006/0239558 A1 | 10/2006 | Rafii et al. |
| 2006/0253793 A1 | 11/2006 | Zhai et al. |
| 2006/0262116 A1 | 11/2006 | Moshiri et al. |
| 2006/0271207 A1 | 11/2006 | Shaw |
| 2006/0280055 A1 | 12/2006 | Miller et al. |
| 2006/0282856 A1 | 12/2006 | Errico et al. |
| 2006/0282859 A1 | 12/2006 | Garbow et al. |
| 2007/0013718 A1 | 1/2007 | Ohba |
| 2007/0018973 A1 | 1/2007 | Shih et al. |
| 2007/0033607 A1 | 2/2007 | Bryan |
| 2007/0060336 A1 | 3/2007 | Marks et al. |
| 2007/0075978 A1 | 4/2007 | Chung |
| 2007/0098222 A1 | 5/2007 | Porter et al. |
| 2007/0098254 A1 | 5/2007 | Yang et al. |
| 2007/0140532 A1 | 6/2007 | Goffin |
| 2007/0143715 A1 | 6/2007 | Hollins et al. |
| 2007/0143787 A1 | 6/2007 | Cankaya |
| 2007/0150281 A1 | 6/2007 | Hoff |
| 2007/0150916 A1 * | 6/2007 | Begole et al. .................. 725/12 |
| 2007/0203685 A1 | 8/2007 | Takano |
| 2007/0214292 A1 | 9/2007 | Hayes et al. |
| 2007/0216894 A1 | 9/2007 | Garcia et al. |
| 2007/0219430 A1 | 9/2007 | Moore |
| 2007/0260984 A1 | 11/2007 | Marks et al. |
| 2007/0271580 A1 | 11/2007 | Tischer et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0016544 A1 | 1/2008 | Lee et al. |
| 2008/0018591 A1 | 1/2008 | Pittel et al. |
| 2008/0026838 A1 | 1/2008 | Dunstan et al. |
| 2008/0027984 A1 | 1/2008 | Perdomo |
| 2008/0033790 A1 | 2/2008 | Nickerson et al. |
| 2008/0059578 A1 | 3/2008 | Albertson et al. |
| 2008/0062257 A1 | 3/2008 | Corson |
| 2008/0065243 A1 | 3/2008 | Fallman et al. |
| 2008/0081694 A1 | 4/2008 | Hong et al. |
| 2008/0092159 A1 | 4/2008 | Dmitriev et al. |
| 2008/0100620 A1 | 5/2008 | Nagai et al. |
| 2008/0100825 A1 | 5/2008 | Zalewski |
| 2008/0124690 A1 | 5/2008 | Redlich |
| 2008/0126937 A1 | 5/2008 | Pachet |
| 2008/0134102 A1 | 6/2008 | Movold et al. |
| 2008/0151113 A1 | 6/2008 | Park |
| 2008/0152191 A1 | 6/2008 | Fujimura et al. |
| 2008/0163130 A1 | 7/2008 | Westerman |
| 2008/0163283 A1 | 7/2008 | Tan et al. |
| 2008/0178126 A1 | 7/2008 | Beeck |
| 2008/0215972 A1 | 9/2008 | Zalewski et al. |
| 2008/0215973 A1 | 9/2008 | Zalewski et al. |
| 2008/0234023 A1 | 9/2008 | Mullahkhel et al. |
| 2008/0266328 A1 | 10/2008 | Fong |
| 2008/0310707 A1 | 12/2008 | Kansal et al. |
| 2009/0013366 A1 | 1/2009 | You et al. |
| 2009/0019397 A1 | 1/2009 | Buffet et al. |
| 2009/0025024 A1 | 1/2009 | Beser et al. |
| 2009/0027337 A1 | 1/2009 | Hildreth |
| 2009/0036764 A1 | 2/2009 | Rivas et al. |
| 2009/0037945 A1 | 2/2009 | Greig et al. |
| 2009/0051648 A1 | 2/2009 | Shamaie et al. |
| 2009/0070798 A1 | 3/2009 | Lee et al. |
| 2009/0072992 A1 | 3/2009 | Yun |
| 2009/0073136 A1 | 3/2009 | Choi |
| 2009/0085864 A1 | 4/2009 | Kutliroff et al. |
| 2009/0089225 A1 | 4/2009 | Baier et al. |
| 2009/0094627 A1 * | 4/2009 | Lee et al. .................. 725/9 |
| 2009/0094628 A1 | 4/2009 | Lee et al. |
| 2009/0094629 A1 | 4/2009 | Lee et al. |
| 2009/0094630 A1 | 4/2009 | Brown |
| 2009/0106645 A1 | 4/2009 | Knobel |
| 2009/0112817 A1 | 4/2009 | Jung et al. |
| 2009/0116684 A1 | 5/2009 | Andreasson |
| 2009/0133051 A1 | 5/2009 | Hildreth |
| 2009/0141933 A1 | 6/2009 | Wagg |
| 2009/0143141 A1 | 6/2009 | Wells et al. |
| 2009/0146775 A1 | 6/2009 | Bonnaud et al. |
| 2009/0157472 A1 | 6/2009 | Burazin et al. |
| 2009/0167679 A1 | 7/2009 | Klier et al. |
| 2009/0167882 A1 | 7/2009 | Chen et al. |
| 2009/0175540 A1 | 7/2009 | Dariush et al. |
| 2009/0178097 A1 | 7/2009 | Kim et al. |
| 2009/0183125 A1 | 7/2009 | Magal et al. |
| 2009/0183220 A1 | 7/2009 | Amento |
| 2009/0195392 A1 | 8/2009 | Zalewski |
| 2009/0217315 A1 * | 8/2009 | Malik et al. .................. 725/9 |
| 2009/0221368 A1 | 9/2009 | Yen et al. |
| 2009/0234718 A1 | 9/2009 | Green |
| 2009/0235195 A1 | 9/2009 | Shin |
| 2009/0251425 A1 | 10/2009 | Sohn et al. |
| 2009/0252423 A1 | 10/2009 | Zhu et al. |
| 2009/0259960 A1 | 10/2009 | Steinle et al. |
| 2009/0296002 A1 | 12/2009 | Lida et al. |
| 2009/0303231 A1 | 12/2009 | Robinet et al. |
| 2009/0320055 A1 | 12/2009 | Langille et al. |
| 2009/0327977 A1 | 12/2009 | Bachfischer et al. |
| 2010/0005492 A1 | 1/2010 | Takano et al. |
| 2010/0007801 A1 | 1/2010 | Cooper et al. |
| 2010/0026914 A1 | 2/2010 | Chung et al. |
| 2010/0033427 A1 | 2/2010 | Marks et al. |
| 2010/0070913 A1 | 3/2010 | Murrett et al. |
| 2010/0070987 A1 | 3/2010 | Amento et al. |
| 2010/0070992 A1 | 3/2010 | Morris et al. |
| 2010/0073329 A1 | 3/2010 | Raman et al. |
| 2010/0083373 A1 | 4/2010 | White et al. |
| 2010/0086204 A1 | 4/2010 | Lessing |
| 2010/0093435 A1 | 4/2010 | Glaser et al. |
| 2010/0095206 A1 | 4/2010 | Kim |
| 2010/0095332 A1 | 4/2010 | Gran et al. |
| 2010/0107184 A1 | 4/2010 | Shintani |
| 2010/0122286 A1 | 5/2010 | Begeja et al. |
| 2010/0138780 A1 | 6/2010 | Marano et al. |
| 2010/0138797 A1 | 6/2010 | Thorn |
| 2010/0138798 A1 | 6/2010 | Wilson et al. |
| 2010/0146389 A1 | 6/2010 | Yoo et al. |
| 2010/0151946 A1 | 6/2010 | Wilson et al. |
| 2010/0153856 A1 | 6/2010 | Russ |
| 2010/0153984 A1 | 6/2010 | Neufeld |
| 2010/0169157 A1 | 7/2010 | Muhonen et al. |
| 2010/0169905 A1 | 7/2010 | Fukuchi et al. |
| 2010/0191631 A1 | 7/2010 | Weidmann |
| 2010/0207874 A1 | 8/2010 | Yuxin et al. |
| 2010/0207875 A1 | 8/2010 | Yeh |
| 2010/0211439 A1 * | 8/2010 | Marci et al. .................. 725/12 |
| 2010/0235667 A1 | 9/2010 | Mucignat et al. |
| 2010/0248832 A1 | 9/2010 | Esaki et al. |
| 2010/0251280 A1 | 9/2010 | Sofos et al. |
| 2010/0251300 A1 | 9/2010 | Fahey et al. |
| 2010/0271802 A1 | 10/2010 | Recker et al. |
| 2010/0278393 A1 * | 11/2010 | Snook et al. .................. 348/142 |

(56) References Cited

U.S. PATENT DOCUMENTS

| | | |
|---|---|---|
| 2010/0286983 A1 | 11/2010 | Cho |
| 2010/0295782 A1 | 11/2010 | Binder |
| 2010/0295783 A1 | 11/2010 | El Dokor et al. |
| 2010/0306712 A1 | 12/2010 | Snook et al. |
| 2010/0327766 A1 | 12/2010 | Recker et al. |
| 2010/0332842 A1 | 12/2010 | Kalaboukis et al. |
| 2010/0333137 A1 | 12/2010 | Hamano et al. |
| 2011/0007142 A1 | 1/2011 | Perez et al. |
| 2011/0016102 A1 | 1/2011 | Hawthorne et al. |
| 2011/0026765 A1 | 2/2011 | Ivanich |
| 2011/0037866 A1 | 2/2011 | Iwamoto |
| 2011/0038547 A1 | 2/2011 | Hill |
| 2011/0066682 A1 | 3/2011 | Aldunate et al. |
| 2011/0072448 A1 | 3/2011 | Stiers et al. |
| 2011/0077513 A1 | 3/2011 | Rofougaran |
| 2011/0084983 A1 | 4/2011 | Demaine |
| 2011/0085705 A1 | 4/2011 | Izadi et al. |
| 2011/0115887 A1 | 5/2011 | Yoo et al. |
| 2011/0126154 A1 | 5/2011 | Boehler et al. |
| 2011/0145040 A1 | 6/2011 | Zahn et al. |
| 2011/0145041 A1 | 6/2011 | Salamatov et al. |
| 2011/0157009 A1 | 6/2011 | Kim et al. |
| 2011/0161912 A1 | 6/2011 | Eteminan et al. |
| 2011/0164143 A1 | 7/2011 | Shintani et al. |
| 2011/0173589 A1 | 7/2011 | Guttman et al. |
| 2011/0208582 A1 | 8/2011 | Hoyle |
| 2011/0214141 A1 | 9/2011 | Oyaizu |
| 2011/0216059 A1 | 9/2011 | Espiritu et al. |
| 2011/0242305 A1 | 10/2011 | Peterson et al. |
| 2011/0246572 A1 | 10/2011 | Kollenkark et al. |
| 2011/0254859 A1 | 10/2011 | Matsuda |
| 2011/0263946 A1 | 10/2011 | el Kaliouby et al. |
| 2011/0264531 A1 | 10/2011 | Bhatia et al. |
| 2011/0282745 A1 | 11/2011 | Meoded et al. |
| 2011/0316845 A1 | 12/2011 | Roberts et al. |
| 2011/0321096 A1 | 12/2011 | Landow et al. |
| 2012/0005632 A1 | 1/2012 | Broyles, III et al. |
| 2012/0011528 A1 | 1/2012 | Nielsen et al. |
| 2012/0011530 A1 | 1/2012 | Bentolila et al. |
| 2012/0030637 A1 | 2/2012 | Dey et al. |
| 2012/0047525 A1 | 2/2012 | Campagna et al. |
| 2012/0051719 A1 | 3/2012 | Marvit |
| 2012/0060176 A1 | 3/2012 | Chai et al. |
| 2012/0079521 A1 | 3/2012 | Garg et al. |
| 2012/0084812 A1 | 4/2012 | Thompson et al. |
| 2012/0105257 A1 | 5/2012 | Murillo et al. |
| 2012/0105473 A1 | 5/2012 | Bar-Zeev et al. |
| 2012/0109726 A1 | 5/2012 | Ruffini |
| 2012/0124603 A1* | 5/2012 | Amada .......... 725/10 |
| 2012/0192233 A1 | 7/2012 | Wong |
| 2012/0209715 A1 | 8/2012 | Lotan et al. |
| 2012/0226981 A1 | 9/2012 | Clavin |
| 2012/0268362 A1 | 10/2012 | Yee |
| 2012/0280897 A1 | 11/2012 | Balan et al. |
| 2012/0290508 A1 | 11/2012 | Bist |
| 2012/0304059 A1 | 11/2012 | McCloskey |
| 2012/0304206 A1 | 11/2012 | Roberts et al. |
| 2012/0306734 A1 | 12/2012 | Kim et al. |
| 2012/0324491 A1 | 12/2012 | Bathiche et al. |
| 2013/0007671 A1 | 1/2013 | Hammontree et al. |
| 2013/0014144 A1 | 1/2013 | Bhatia et al. |
| 2013/0054652 A1 | 2/2013 | Antonelli et al. |
| 2013/0117771 A1 | 5/2013 | Lee et al. |
| 2013/0136358 A1 | 5/2013 | Dedhia et al. |
| 2013/0145384 A1* | 6/2013 | Krum et al. .......... 725/10 |
| 2013/0145385 A1 | 6/2013 | Aghajanyan |
| 2013/0159555 A1 | 6/2013 | Rosser |
| 2013/0198690 A1 | 8/2013 | Barsoum et al. |
| 2013/0226464 A1 | 8/2013 | Marci et al. |
| 2013/0232515 A1 | 9/2013 | Rivera et al. |
| 2013/0268954 A1 | 10/2013 | Hulten |
| 2013/0268955 A1 | 10/2013 | Conrad |
| 2013/0298146 A1 | 11/2013 | Conrad |
| 2013/0298158 A1 | 11/2013 | Conrad |
| 2014/0109121 A1 | 4/2014 | Krum |
| 2014/0247212 A1 | 9/2014 | Kim |
| 2015/0128161 A1 | 5/2015 | Conrad et al. |

FOREIGN PATENT DOCUMENTS

| | | |
|---|---|---|
| CN | 101095055 | 12/2007 |
| CN | 101202994 | 6/2008 |
| CN | 101254344 | 6/2010 |
| CN | 102713788 | 10/2012 |
| EP | 0583061 | 2/1994 |
| EP | 1315375 | 5/2003 |
| GB | 2423808 | 6/2006 |
| GB | 2459707 | 11/2009 |
| JP | 08044490 | 2/1996 |
| WO | WO-9310708 | 6/1993 |
| WO | WO-9717598 | 5/1997 |
| WO | WO-9915863 | 4/1999 |
| WO | WO-9944698 | 9/1999 |
| WO | WO-0159975 | 8/2001 |
| WO | WO-0163916 | 8/2001 |
| WO | WO-0169799 | 9/2001 |
| WO | WO-02082249 | 10/2002 |
| WO | WO-03001722 | 1/2003 |
| WO | WO-03015056 | 2/2003 |
| WO | WO-03046706 | 6/2003 |
| WO | WO-03054683 | 7/2003 |
| WO | WO-03071410 | 8/2003 |
| WO | WO-03073359 | 9/2003 |
| WO | WO-2007128507 | 11/2007 |
| WO | WO-2008001287 | 1/2008 |
| WO | WO-2009059065 | 5/2009 |
| WO | WO-2011069035 | 6/2011 |

OTHER PUBLICATIONS

"Measuring emotion over the web", Retrieved at <<http://www.affectiva.com/affdex/>>, Retrieved Date: Nov. 4, 2011, pp. 3.

"Advisory Action", U.S. Appl. No. 10/396,653, (May 2, 2007),3 pages.

"Advisory Action", U.S. Appl. No 10/396,653, (May 23, 2008),3 pages.

"Application Titled "Controlling Electronic Devices in a Multimedia System Through a Natural User Interface"", U.S. Appl. No. 13/038,024, filed Mar. 2, 2011, pp. 1-46.

"Application Titled "Interaction with Networked Screen Content Via Motion Sensing Device in Retail Setting"", U.S. Appl. No. 13/025,180, filed Feb. 11, 2011, pp. 1-23.

"Commanding Overview", *MSDN*, retrieved from <http://msdn.microsoft.com/en-us/library/ms752308.aspx> on Sep. 27, 2011, 11 pages.

"Designing CEC into your next HDMI Product", *Quantum Data White Paper*, Retrieved from Internet:<URL:http://www.quantumdata.com/pdf/CEC_white_paper.pdf>. Quantum Data, Inc., Elgin, IL, USA, (May 13, 2006),12 pages.

"Final Office Action", U.S. Appl. No. 10/396,653, (Feb. 20, 2009), 12 pages.

"Final Office Action", U.S. Appl. No. 10/396,653, (Feb. 25, 2008),20 pages.

"Final Office Action", U.S. Appl. No. 10/396,653, (Feb. 26, 2007), 18 pages.

"Final Office Action", U.S. Appl. No. 11/626,794, (Jun. 11, 2009), 14 pages.

"Future Media Internet Research Challenges and the Road Ahead", *European Commission Information Society and Media*, Available at <http://www.gatv.ssr.upm.es/nextmedia/images/fmi-tf-white_paper_042010.pdf>,(Apr. 2010),31 pages.

"GWindows: Light-Weight Stereo Vision for Interaction", http://research.microsoft.com/~nuria/gwindows/htm, (Jul. 8, 2005),2 pages.

"International Search Report", PCT Application No. PCT/US2010/036005, (Dec. 24, 2010),3 pages.

(56) References Cited

OTHER PUBLICATIONS

"KinEmote uses Kinect to translate key strokes for Windows applications", techshout.com [online], Retrieved from the Internet:<URL:http://www.techshout.com/gaming/2010/28/kinemote-uses-kinect-to-translate-key-strokes-for-windows-applications/>,(Dec. 28, 2010),2 pages.
"Non-Final Office Action", U.S. Appl. No. 10/396,653, (Sep. 6, 2007), 17 pages.
"Non-Final Office Action", U.S. Appl. No. 10/396,653, (Sep. 8, 2008), 13 pages.
"Non-Final Office Action", U.S. Appl. No. 10/396,653, (Sep. 19, 2006),24 pages.
"Non-Final Office Action", U.S. Appl. No. 11/626,794, (Oct. 27, 2009), 15 pages.
"Non-Final Office Action", U.S. Appl. No. 11/626,794, (Dec. 23, 2008), 18 pages.
"Non-Final Office Action", U.S. Appl. No. 12/474,453, (Sep. 6, 2011), 10 pages.
"Notice of Allowance", U.S. Appl. No. 10/396,653, (Nov. 19, 2009),7 pages.
"Notice of Allowance", U.S. Appl. No. 11/626,794, (May 13, 2010),4 pages.
"Simulation and Training", Division Incorporated,(1994),6 Pages.
"The Case for Kinect", *Eurogamer* [online] Retrieved from the Internet on Aug. 20, 2010: URL:<http://www.eurogamer.net/articles/digitalfoundry-the-case-for-kinect-article?page=2>., (Aug. 7, 2010),pp. 1-7.
U.S. Appl. No. 12/794,406, filed Jun. 4, 2010,37 pages.
"Virtual High Anxiety", *Tech update*, (Aug. 1995),1 Page.
Agarwal, Ankur et al., "High Precision Multi-touch Sensing on Surfaces using Overhead Cameras", *Second Annual IEEE International Workshop on Horizontal Interactive Human-Computer System*, available at <<http://ieeexplore.ieee.org/stamp/stamp.jsp?tp=&arnumber=4384130>>,(Nov. 19, 2007),4 pages.
Aggarwal, et al., "Human Motion Analysis: A Review", *IEEE Nonrigid and Articulated motion Workshop*, University of Texas at Austin, Austin, TX,(1997),pp. 90-102.
Ali, Azarbayejani et al., "Real-Time Self-Calibrating Stereo Person Tracking Using 3-D Shape Estimation from Blob Features", *Proceedings of ICPR*, Vienna, Austria, (Aug. 1996),pp. 627-632.
Althoff, Frank et al., "Using Multimodal Interaction to Navigate in Arbitrary Virtual VRML Worlds", *PUI 2001* Orlando, FL USA, available at <http://citeseerx.ist.psu.edu/viewdoc/download?doi=10.1.1.16.8034&rep=rep1&type=pdf>,(2001),8 pages.
Argyros, et al., "Vision-Based Interpretation of Hand Gestures for Remote Control of a Computer Mouse", Retrieved from: <http://www.ics.forth.gr/~argyros/mypapers/2006_05_hci_virtualmouse.pdf> on Oct. 31, 2007,(2006),pp. 40-51.
Azarbayejani, et al., "Visually Controlled Graphics", *IEEE Transactions on Pattern Analysis and Machine Intelligence*, vol. 15, No. 6, (Jun. 1993),pp. 602-605.
Azoz, Yusuf et al., "Reliable Tracking of Human Arm Dynamics by Multiple Cue Integration and Constraint Fusion", *IEEE Conference on Computer Vision and Pattern Recognition*, (1998),6 pages.
Baudel, Thomas et al., "Charade: Remote Control of Objects using Free-Hand Gestures", *Communications of the ACM*, vol. 36. No. 7, (Jul. 1993),10 pages.
Becker, David A., "Sensei: A Real-Time Recognition, Feedback and Training System for T'ai Chi Gestures", http://citeseer.ist.psu.edu/cache/papers/cs/405/ftp:zSzzSzwhitechapel.media.mit.eduzSzpubzSztech-reporterzsSzTR-426pdf/becker97sensei.pdf, (Jun. 1993),50 pages.
Berard, Francois "The Perceptual Window-Head Motion as a New Input Stream", *Proceedings of the Seventh IFIP Conference of Human-Computer Interaction*, (1999),238-244.
Bhuiyan, Moniruzzaman et al., "Gesture-controlled user interfaces, what have we done and what's next?", Retrieved at <<http://www.newi.ac.uk/computing/research/pubs/SEIN_BP.pdf>>, (Nov. 27, 2009),10 pages.

Bobic, Nick "Rotating Objects Using Quaternions", Retrieved from the Internet on Aug. 20, 2010: URL http://www.gamasutra.com/view/feature/3278/rotating_objects_quarternions.php.?page=2>., (Jul. 5, 1998),14 pages.
Boverie, S. et al., "Comparison of Structured Light and Stereovision Sensors for New Airbag Generations", *Control Engineering Practice* vol. 11, Issue 12 (2003), available at <<http://homepages.laas.fr/lerasle/pdf/cep03.pdf>>,(Dec. 2003),pp. 1413-1421.
Bowman, Doug A., et al., "New Directions in 3D User Interfaces", *The International Journal of Virtual Reality*, retrieved from <http://citeseerx.ist.psu.edu/viewdoc/download?doi=10.1.1.99.1121&rep=rep1&type=pdf> on Nov. 15, 2011,(2006),pp. 3-14.
Breen, David et al., "Interactive Occlusion and Collision of Real and Virtual Objects in Augmented Reality", *Technical report ECRC-95-02 European Computer-Industry Research Centre GmbH*, Munich, Germany, (1995),22 Pages.
Brogan, David et al., "Dynamically Simulated Characters in Virtual Environments", vol. 18, Issue 5, *IEEE Computer Graphics and Applications*, (Sep./Oct. 1998),pp. 58-69.
Buxton, William et al., "A Study of Two-Handed Input", *Proceedings of CHI '86*, (1986),pp. 321-326.
Cedras, Claudette et al., "Motion-based Recognition: A Survey", *IEEE Proceedings, Image and Vision Computing*, vol. 13, No. 2, (Mar. 1995),pp. 129-155.
Crawford, Stephanie "How Microsoft Kinect Works", *Howstuffworks*[online] Retrieved from the Internet on Aug. 19, 2010: URL:<http://electronics.howstuffworks.com/microsoft-kinect.htm/printable>., pp. 1-5.
Dalton, Angela B., et al., "Sensing User Intention and Context for Energy Management", Duke University, Department of Computer Science, Retrieved from the Internet:<URL:http://www.cs.duke/edu/ari/millywatt/faceoff.pdf>, (Feb. 23, 2003),5 pages.
Darrell, T et al., "Integrated Person Tracking Using Stereo, Color and Pattern Detection", *Proceedings of the Conference on Computer Vision and Pattern Recognition*, (1998),pp. 601-609.
Fisher, et al., "Virtual Environment Display System", *ACM Workshop on Interactive 3D Graphics*, Chapel Hill, NC, (Oct. 1986),12 Pages.
Fitzgerald, et al., "Integration of Kinematic Analysis into Computer Games for Exercise", *Proceedings of CGames 2006—9th International Conference on Computer Games: AI, Animation, Mobile, Educational and Serious Games*, Dublin Ireland, (Nov. 2006),pp. 24-28.
Fitzgerald, Will et al., "Multimodal Event Parsing for Intelligent User Interfaces", *IUI Conference*, (Jan. 2003),8 pages.
Freed, Natalie "Toys Keeping in Touch: Technologies for Distance Play", Retrieved from <<http://people.ischool.berkeley.edu/~daniela/tei2010/gsc09e-freed.pdf>>, (Jan. 24, 2010),2 pages.
Freeman, William et al., "Television Control by Hand Gestures", *International Workshop on Automatic Face and Gesture Recognition*, (1995),pp. 179-183.
Gonzalez, Barb "HDMI CEC", *Home Theater University* [online] Retrieved from the Internet:<URL:http://www.hometheatre.com/hookmeup/208hook>, (Mar. 24, 2008),3 pages.
Granieri, John P., et al., "Simulating Humans in VR", *The British Computer Society, Academic Press*, (Oct. 1994),15 Pages.
Grunder, Alexander "Updated: Xbox 360 Kinect Hand Gesture Media Controls, Voice Control, TV Video Chat.", *eHomeUpgrade* [online] retrieved from the internet:<URL:http://www.ehomeupgrade.com/2010/06/14/updated-xbox-360-kinect-hand-gesture-media-controls-voice-control-tv-video-chat/>, (Jun. 14, 2010),8 pages.
Guiard, Yves "Asymmetric Division of Labor in Human Skilled Bimanual Action: The Kinematic Chain as a Model", *Journal of Motor Behavior*, vol. 19 Issue 4, (1987),486-517.
Guler, Sadiye Z., "Split and Merge Behavior Analysis and Understanding Using Hidden Markov Models", (Oct. 8, 2002),21 pages.
Hardin, Winn "Machine Vision Makes the Leap to Consumer Gaming", *Machine Vision Online*, retrieved from <<http://www.machinevisiononline.org/vision-resources-details.cfm?content_id=2398>> on Mar. 14, 2011,(Dec. 8, 2010),3 pages.
Hasegawa, Shoichi et al., "Human-Scale Haptic Interaction with a Reactive Virtual Human in a Real-Time Physics Simulator", *ACM Computers in Entertainment*, vol. 4, No. 3, (Jul., 2006),12 Pages.

(56) References Cited

OTHER PUBLICATIONS

He, Lei "Generation of Human Body Models", University of Auckland, New Zealand (Apr. 2005),111 Pages.
Hongo, Hitoshi et al., "Focus of Attention for Face and Hand Gesture Recognition Using Multiple Cameras", *4th IEEE International Conference on Automatic Face and Gesture Recognition*, Grenoble, France, (Mar. 2000),pp. 156-161.
Horvitz, Eric "Principles of Mixed-Initiative User Interfaces", *Proceedings of CHI*, (1999),8 pages.
Horvitz, Eric et al., "A Computational Architecture for Conversation", *Proceedings of the Seventh International Conference on User Modeling*, (1999),pp. 201-210.
Hourcade, Juan P., "Architecture and Implementation of Java Package for Multiple Input Devices (MID)", *HCIL Technical Report No. 99-08* (May 1999); http://www.cs.umd.edu/hcil, (May 1999),7 pages.
Isard, Michael et al., "CONDENSATION—Conditional Density Propagation for Visual Tracking", *International Journal of Computer Vision* 29(1), Netherlands, (1998),pp. 5-28.
Jacko, "HDI Dune Prime 3.0 Part 2.", Retrieved from the internet: <URL:http://www.jacko.my/2010/06/hdi-dune-prime-30-part-2.html>, (Jun. 19, 2010),15 pages.
Jojic, Nebojsa et al., "Detection and Estimation of Pointing Gestures in Dense Disparity Maps", *Proceedings of IEEE International Conference on Automatic Face and Gesture Recognition*, (2000),pp. 1000-1007.
Kabbash, P et al., "The "Prince" Technique: Fitts' Law and Selection Using Area Cursors", *Proceedings of CHI'95*, http://www.billbuxton.com/prince.html, (1995),pp. 273-279.
Kanade, et al., "Development of Video-Rate Stereo Machine", *Proceedings of 94 ARPA Image Understanding Workshop*, (1994),pp. 549-558.
Kanade, Takeo et al., "A Stereo Machine for Video-rate Dense Depth Mapping and Its New Applications", *IEEE Computer Society Conference on Computer Vision and Pattern Recognition*, The Robotics Institute, Carnegie Mellon University, Pittsburgh, PA,(1996),pp. 196-202.
Kim, Song-Gook et al., "Multi-Touch Tabletop Interface Technique for HCI", retrieved from <<http://210.119.33.7/apis6/paper/data/63-multi-touch%20tabl.pdf>> on Mar. 16, 2011,4 pages.
Kjeldsen, Frederik "Visual Interpretation of Hand Gestures as Practical Interface Modality", *Ph.D. Dissertation*, Columbia University Department of Computer Science, (1997),168 pages.
Klompmaker, Florian "D5.1—State of the art analysis and recommendations on 'Context Awareness', 'Human Computer Interaction' and 'Mobile Users Interfaces'", *Information Technology for European Advancement (ITEA), Local Mobile Services*, Retrieved from the Internet:<URL:http://www.loms-itea.org/deliverables/LOMS_D5.1_v1.0.pdy>, (Jul. 2, 2007),55 pages.
Kohler, Marcus "Technical Details and Ergonomical Aspects of Gesture Recognition applied in Intelligent Home Environments", Germany, (1997),35 Pages.
Kohler, Markus "Special Topics of Gesture Recognition Applied in Intelligent Home Environments", *In Proceedings of the Gesture Workshop*, Germany, (1998),12 Pages.
Kohler, Markus "Vision Based Remote Control in Intelligent Home Environments", University of Erlangen-Nuremberg, Germany, (1996),8 Pages.
Kolsch, Mathias et al., "Vision-Based Interfaces for Mobility", Retrieved from <<http://ieeexplore.ieee.org/stamp/stamp.jsp?tp=&arnumber=1331713>>, (Aug. 22, 2004),9 pages.
Kwon, et al., "Combining Body Sensors and Visual Sensors for Motion Training", *Computer Graphics Laboratory*, http://graphics.ethz.ch/~dkwon/downloads/publications/ace05_ace.pdf, Downloaded 2009,(2005),pp. 1-8.
Latoschik, Marc E., "A User Interface Framework for Multimodal VR Interactions", *ICMI'05*, Trento, Italy, Oct. 4-6, 2005, available at <http://citeseerx.ist.psu.edu/viewdoc/download?doi=10.1.1.91.2941&rep=rep1&type=pdf>,(Oct. 4, 2005),8 pages.

Le, Nguyen T., "EmuPlayer: Music Recommendation System Based on User Emotion Using Vital-sensor", *Thesis*, Keio University, Available at <http://www.sfc.wide.ad.jp/thesis/2011/files/sunny-publish-thesis.pdf>,(2010),85 pages.
Leal, Anamary et al., "Initial Explorations into the User Experience of 3D File Browsing", *Proceedings of HCI 2009*, retrieved from <http://www.eecs.ucf.edu/isuelab/publications/pubs/p339-leal-3dfiles.pdf> on Nov. 15, 2011,(Sep. 2009),pp. 339-344.
Li, Stan Z., et al., "A Near-Infrared Image Based Face Recognition System", available at <<http://www.cbsr.ia.ac.cn/Li%20Group/papers/IR-Face-FG06.pdf>>,(Apr. 2006),6 pages.
Livingston, Mark A., "Vision-based Tracking with Dynamic Structured Light for Video See-through Augmented Reality", *TheUniversity of NorthCarolina at ChapelHill*, North Carolina, USA, (1998),145 Pages.
Long, Jr., Allan C., et al., "Implications for a Gesture Design Tool", *Proceedings of Chi'99*, (1999),pp. 40-47.
Maes, Pattie et al., "The ALIVE System: Wireless, Full-body, Interaction with Autonomous Agents", *ACM Multimedia Systems, Special Issue on Multimedia and Multisensory Virtual Worlds*, (Nov. 1995),17 pages.
Maltby, John R., "Using Perspective in 3D File Management: Rotating Windows and Billboarded Icons", *Proceedings of the International Conference on Computer Graphics, Imaging and Visualisation (CGIV'06 )*, available at <http://ieeexplore.ieee.org/stamp/stamp.jsp?tp=&arnumber=1663764>,(Jul. 28, 2006),8 pages.
Martin, Benoit "VirHKey: A VIRtual Hyperbolic KEYboard with Gesture Interaction and Visual Feedback for Mobile Devices", http://delivery.acm.org/10.1145/1090000/1085794/p99-martin.pdf?key1=1085794&key2=4890534611&coll=portal&dl=ACM&CFID=11111111&CFTOKEN=2222222, (Sep. 2005),8 pages.
McCrae, James et al., "Exploring the Design Space of Multiscale 3D Orientation", *AVI '10*, retrieved from <http://www.autodeskresearch.com/pdf/avi2010-final.pdf> on Nov. 15, 2011,(May 29, 2010),8 pages.
Mignot, Christopher et al., "An Experimental Study of Future 'Natural' Multimodal Human-Computer Interaction", *Proceedings of INTERCHI93*, (1993),pp. 67-68.
Millan, Maria S., et al., "Unsupervised Defect Segmentation of Patterned Materials under NIR Illumination", *Journal of Physics: Conference Series 274* (2011) 012044, available at <<http://iopscience.iop.org/1742-6596/274/1/012044/pdf/1742-6596_274_1_012044.pdf>>,(2011),9 pages.
Minge, Michael "Dynamics of User Experience", *Workshop on Research Goals and Strategies for Studying User Experience and Emotion*, Available at <http://www.cs.uta.fi/~ux-emotion/submissions/Minge.pdf>,(2008),pp. 1-5.
Miyagawa, Ryohei et al., "CCD-Based Range-Finding Sensor", *IEEE Transactions on Electron Devices*, vol. 44, No. 10, (Oct. 1997),pp. 1648-1652.
Moeslund, Thomas B., et al., "A Survey of Computer Vision-Based Human Motion Capture", *Computer Vision and Image Understanding: CVIU*, vol. 81, No. 3, (2001),pp. 231-269.
Morency, Louis-Philippe et al., "Contextual Recognition of Head Gestures", Trento, Italy http://delivery.acm.org/10.1145/1090000/1088470/p18_morency.pdf?key1=1088470&key2=8870534611&coll=portal&dl=ACM&CFID=11111111&CFTOKEN=2222222, 7 pages.
Morrison, Gerald D., "A Camera-Based Touch Interface for Pervasive Displays", Retrieved from <<http://ubicomp.algoritmi.uminho.pt/perdisplay/docs/Morrison-Camera%20Touch_SV_Rev1.pdf>> on Mar. 16, 2011,7 pages.
Moscovich, Tomer "Multi-touch Interaction", Brown University, *CHI 2006*, Apr. 22-27, 2006, Montreal, Quebec, Canada, (Apr. 22, 2006),4 pages.
Moyle, et al., "Gesture Navigation: An Alternative 'Back' for the Future", *Proceedings of CHI'02*, (2002),pp. 882-823.
Nielsen, Michael et al., "A Procedure for Developing Intuitive and Ergonomic Gesture Interfaces for Man-Machine Interaction", *Technical Report CVMT 03-01*, ISSN 1601-3646. CVMT, Aalborg University, (Mar. 2003),12 pages.
Oh, Alice et al., "Evaluating Look-to-talk: A Gaze-Aware Interface in a Collaborative Environment", *CHI'02*, (2002),650-651.

(56) References Cited

OTHER PUBLICATIONS

Oviatt, Sharon "Ten Myths of Multimodal Interaction", *Communications of the ACM*. vol. 42, No. 11, (Nov. 1999),8 pages.
Paquit, Vincent et al., "Near-Infrared Imaging and Structured Light Ranging for Automatic Catheter Insertion", *Proceedings of SPIE* vol. 6141, 61411T, (2006), available at <<http://www.cs.rpi.edu/~chakrn2/work/catheter_plan/paquit_06.pdf>>,(2006),9 pages.
Parrish, Kevin "Microsoft Does Want Core Games, FPS for Kinect", *Tom's Guide: Tech for Real Life* [online], Retrieved from the Internet on Aug. 20, 2010: URL: <http://www.tomsguide.com/us/Core-Gamers-Kinect-FPS-Action,news-7195.html>., (Jun. 23, 2010),1 page.
Pavlou, Paul A., et al., "Measuring the Effects and Effectiveness of Interactive Advertising: A Research Agenda", *Journal of Interactive Advertising*, vol. 1, No. 1 (Fall 2000), Available at <http://scholargoogle.co.in/scholar_url?hl=en&q=http://jiad.org/download%3Fp%3D6&sa=X&scisig=AAGBfm3He5PA4sgMGDXTyQuqaVQn4Q3nZw&oi=scholarr>,(Oct. 2000),pp. 62-78.
Pavlovic, Vladimir et al., "Visual Interpretation of Hand Gestures for Human-Computer Interaction: A Review", *IEEE Transactions on Pattern Analysis and Machine Intelligence*, vol. 19, No. 7, (Jul. 1997),pp. 677-695.
Qian, et al., "A Gesture-Driven Multimodal Interactive Dance System", *IEEE International Conference on Multimedia and Expo*, Taipei, (Jun. 2004),pp. 1579-1582.
Raymer, A "Gestures and Words: Facilitating Recovery in Aphasia", *The ASHA Leader*, http://www.asha.org/about/publications/leader-online/archives/2007/070619/f070619a.htm, (Jun. 19, 2007),6 pages.
Rigoll, Gerhard et al., "High Performance Real-Time Gesture Recognition Using Hidden Markov Models", *Gesture and Sign Language in Human-Computer Interaction*, vol. LNAI 1371, Frohlich, ed., (1997),pp. 69-80.
Rosenhahn, Bodo et al., "Automatic Human Model Generation", University of Auckland (CITR), New Zealand, (2005),pp. 41-48.
Sakir, Samit "Kinect is your personal trainer in EA Sports Active 2", *Gamerss* [online] Retrieved from the Internet on Aug. 20, 2010: URL: <http://www.gamerss.co.uk/kinect-is-your-personal-trainer-in-ea-sports-active-2>., (Jul. 26, 2010),4 pages.
Schick, Alexander et al., "Extending Touch: Towards Interaction with Large-Scale Surfaces", *ITS '09*, Nov. 23-25, 2009, Banff, Alberta, Canada, available at <<http://www.iosb.fraunhofer.de/servlet/is/33404/urn_nbn_de_0011-n-1159494.pdf>>,(Nov. 23, 2009),8 pages.
Schielel, Seth "A Home System Leaves Hand Controls in the Dust, Kinect by Microsoft Keeps You Entertained Hands Free", *The New York Times* [online]Retrieved from the Internet:<URL:http://www.nytimes.com/2010/11/04/arts/television/04kinect.html>, (Nov. 4, 2010),3 pages.
Shao, Jiang et al., "An Open System Architecture for a Multimedia and Multimodal User Interface", *Japanese Society for Rehabilitation of Persons with Disabilities (JSRDP)*, Japan, (Aug. 24, 1998),8 Pages.
Sharma, et al., "Method of Visual and Acoustic Signal Co-Analysis for Co-Verbal Gesture Recognition", U.S. Appl. No. 60/413,998, (Sep. 19, 2002),16 pages.
Sharma, Rajeev M., et al., "Speech-Gesture Driven Multimodal Interfaces for Crisis Management", *Proceedings of IEEE Special Issue on Multimodal Human-Computer Interface*, (2003),28 pages.
Shen, Guobin et al., "Dita: Enabling Gesture-Based Human-Device Interaction using Mobile Phone", Retrieved at <<:http://research.microsoft.com/en-us/people/jackysh/dita.pdf>>, (Oct. 1, 2010),pp. 1-14.
Sheridan, Thomas et al., "Virtual Reality Check", *Technology Review*, vol. 96, No. 7, (Oct. 1993),9 Pages.
Shivappa, et al., "Person Tracking with Audio-Visual Cues Using the Iterative Decoding Framework", *IEEE Fifth International Conference on Advanced Video and Signal Based Surveillance, AVSS 08*, Santa Fe, NM, (Sep. 2008),260-267.
Simeone, Luca et al., "Toys++ AR Embodied Agents as Tools to Learn by Building", Retrieved from <<http://ieeexplore.ieee.org/stamp/stamp.jsp?arnumber=05572598>>, (Jul. 5, 2010),2 pages.
Stevens, Jane "Flights into Virtual Reality Treating Real World Disorders", *The Washington Post, Science Psychology*, (Mar. 27, 1995),2 Pages.
Tilley, Steve "E3 09: Project Natal exposed", *Load This* [online] Retrieved from the Internet:<URL:http://blogs.canoe.ca/loadthis/general/e3-09-project-natal-exposed/>, (Jun. 1, 2009),4 pages.
Todd, Paul "Google Campaign Insights: Better Measurement for Display Advertising", Retrieved from: <http://adwordsagency.blogspot.com/2009/10/campaign-insights-better-measurement.html> on Nov. 14, 2011,(Oct. 19, 2009),3 pages.
Toyama, Kentaro et al., "Probabilistic Tracking in a Metric Space", *Eighth International Conference on Computer Vision*, Vancouver Canada, vol. 2, (Jul. 2001),8 pages.
Tresadern, Philip A., et al., "Visual Analysis of Articulated Motion", *DPhil Thesis*, University of Oxford, Oxford, U.K., (Oct. 12, 2006),1-171.
Vaucelle, Cati et al., "Picture This! Film Assembly Using Toy Gestures", Retrieved from <<http://web.media.mit.edu/~cati/PictureThis_Ubicomp.pdf>>, (2008),10 pages.
Wilson, Andrew et al., "GWindows: Towards Robust Perception-Based UI", *Microsoft Research*, (2003),pp. 1-8.
Wilson, et al., "Hidden Markov Models for Modeling and Recognizing Gesture Under Variation", *Hidden Markov Model: Applications in Computer Vision., T. Caelli, ed. World Scientific*, (2001),36 pages.
Worden, Aileen et al., "Making Computers Easier for Older Adults to Use: Area Cursors and Sticky Icons", *CHI 97*, Atlanta Georgia, USA, (1997),pp. 266-271.
Wren, Christopher et al., "Pfinder: Real-Time Tracking of the Human Body", *IEEE Transactions on Pattern Analysis and Machine Intelligence*, vol. 19, No. 7, (Jul. 1997),pp. 780-785.
Yakut, Isil D., et al., "User and Task Analysis of Multi-Level 3D File Browser", *Dept. of Computer Engineering*, Bilkent University, Ankara, Turkey, retrieved from <http://www.cs.bilkent.edu.tr/~cansin/projects/cs560-3dui/multi-level-3d-file-browser/3dui-report.pdf> on Nov. 15, 2011,4 pages.
Yoda, Ikushi et al., "Utilization of Stereo Disparity and Optical Flow Information for Human Interaction", *Proceedings of the Sixth International Conference on Computer Vision, IEEE Computer Society*, Washington D.C., USA, (1998),5 pages.
Zhai, Shumin et al., "The "Silk Cursor": Investigating Transparency for 3D Target Acquisition", *CHI 94*, (1994),pp. 273-279.
Zhang, Zhengyou "A Flexible New Technique for Camera Calibration", *IEEE Transactions on Pattern Analysis and Machine Intelligence*, vol. 22, No. 11, (Nov. 2000),pp. 1330-1334.
Zhang, Zhengyou "Flexible Camera Calibration by Viewing a Plane from Unknown Orientations", *Microsoft Research*, (1999),8 pages.
Zhao, Liang "Dressed Human Modeling, Detection, and Parts Localization", *The Robotics Institute*, Carnegie Mellon University, Pittsburgh, PA, (2001),121 Pages.
"Final Office Action", U.S. Appl. No. 12/474,453, (May 10, 2012), 14 pages.
"Signal Processing Institute", http://ltswww.epfl.ch/~alahi/student_projects/proposals.shtml#4, Downloaded Feb. 2, 2009, 4 pages.
Walker, et al., "Age Related Differences in Movement Control: Adjusting Submovement Structure to Optimize Performance", *Journals of Gerontology*, (Jan. 1997), pp. 40-52.
Welford, Alan T., "Signal, Noise, Performance, and Age.", *Human Factors*, vol. 23, Issue 1, http://www.ingentaconnect.com/content/hfes/hf/1981/00000023/00000001/art0009, (1981), pp. 97-109.
"Foreign Office Action", Canadian Application No. 2775700, (Aug. 24, 2012), 2 pages.
"Foreign Office Action", Canadian Application No. 2775814, (Aug. 24, 2012), 3 pages.
"European Search Report", European Patent Application No. 12195349.1, (Apr. 22, 2013), 3 pages.
"Final Office Action", U.S. Appl. No. 12/794,406, (Apr. 22, 2013),14 pages.
"Final Office Action", U.S. Appl. No. 13/309,859, (May 15, 2013),13 pages.

(56) References Cited

OTHER PUBLICATIONS

"Final Office Action", U.S. Appl. No. 13/439,284, (Jun. 3, 2013), 27 pages.
"Foreign Office Action", European Patent Application No. 12194891.3, (Apr. 24, 2013),5 pages.
"Non-Final Office Action", U.S. Appl. No. 13/093,621, (Jun. 20, 2013), 7 pages.
"Non-Final Office Action", U.S. Appl. No. 13/488,046, (Jun. 13, 2013), 8 pages.
"Recognizing Visual Focus of Attention from Head Pose in Natural Meetings", *IEEE Transactions on Systems, Man, and Cybernetics, Part B: Cybernetics—Special Issue on Human Computing*, vol. 39, Issue 1, (Feb. 2009), 36 pages.
"Response to Non-Final Office Action", U.S. Appl. No. 12/794,406, (Feb. 14, 2013), 12 pages.
"Supplementary European Search Report", European Patent Application Number 12194891.3, (Apr. 4, 2013),3 pages.
Asteriadis, Stylianos et al., "Estimation of Behavioral User State based on Eye Gaze and Head Pose—Application in an e-Learning Environment", *Journal of Multimedia Tools and Applications*, vol. 41, Issue 3, (Feb. 2009), 25 pages.
Ba, Sileye O., et al., "Head Pose Tracking and Focus of Attention Recognition Algorithms in Meeting Rooms", *Proceedings of the 1st International Evaluation Conference on Classification of Events, Activities and Relationships*, (Apr. 6, 2006),12 pages.
Boser, Bernhard E., et al., "A Training Algorithm for Optimal Margin Classifiers", *Proceedings of the Fifth Annual Workshop on Computational Learning Theory*, (Jul. 27, 1992), 9 pages.
Bradley, Margaret M., et al., "Measuring Emotion: The Self-Assessment Manikin and the Semantic Differential"*In Journal of Behavior Therapy and Experimental Psychiatry*, vol. 25, Issue 1, (Mar. 1994),11 pages.
Chang, Chih-Chung et al., "LIBSVM: A Library for Support Vector Machines", retrieved from <http://www.csie.ntu.edu.tw/~cjlin/libsvm/> on Apr. 1, 2013, 4 pages.
El Kaliouby, Rana et al., "Real Time Inference of Complex Mental States from Facial Expressions and Head Gestures", *Proceedings of Conference on Computer Vision and Pattern Recognition Workshop*, (Jun. 27, 2004), 20 pages.
Grace, Richard et al., "A Drowsy Driver Detection System for Heavy Vehicles", *Proceedings of the 17th Digital Avionics Systems Conference*, vol. 2, (Oct. 31, 1998), 8 pages.
Guyon, Isabelle et al., "An Introduction to Variable and Feature Selection", *In Journal of Machine Learning Research*, vol. 3, (Mar. 2003), pp. 1157-1182.
Kapoor, Ashish et al., "Multimodal Affect Recognition in Learning Environments", *Proceedings of the 13th Annual ACM International Conference on Multimedia*, (Nov. 6, 2005), 6 pages.
Liang, Lin et al., "Face Alignment via Component-Based Discriminative Search", *Computer Vision, ECCV 2008, Lecture Notes in Computer Science*, vol. 5303, (2008),14 pages.
McDuff, Daniel "Affective Storytelling: Automatic Measurement of Story Effectiveness from Emotional Responses Collected over the Internet", *PhD Thesis*, retrieved from <http://web.media.mil.edu/~djmcduff/documents/McDuff_Thesis_Proposal.pdf> pdf>>,(Jun. 6, 2012),16 pages.
McDuff, Daniel et al., "Crowdsourcing Facial Responses to Online Videos", *Proceedings of the IEEE Transactions on Affective Computing*, vol. 3, Issue 4, (Oct. 2012), pp. 456-468.
McDuff, et al., "AffectAura: An Intelligent System for Emotional Memory", *In Proceedings of the SIGCHI Conference on Human Factors in Computing Systems*, Retrieved from <http://www.affectiva.com/assets/Q-Sensor-Microsoft-Publication.pdf>,(May 5, 2012),10 pages.
Op Den Akker, Rieks et al., "Supporting Engagement and Floor Control in Hybrid Meetings", *In Cross-Modal Analysis of Speech, Gestures, Gaze and Facial Expressions*, (Jul. 2009),15 pages.
Peacock, James et al., "Which Broadcast Medium Better Drives Engagement? Measuring the Powers of Radio and Television with Electromyography and Skin-Conductance Measurements", *In Journal of Advertising Research*, vol. 51, Issue 4, (Dec. 2011), 8 pages.
Poels, Karolien et al., "How to Capture the Heart? Reviewing 20 Years of Emotion Measurement in Advertising", *In the Journal of Advertising Research*, vol. 46, Issue 1, (Mar. 2006), 48 pages.
Viola, Paul et al., "Robust Real-Time Face Detection", *In International Journal of Computer Vision*, vol. 57, Issue 2, (May 2004),18 pages.
Voit, Michael et al., "Deducing the Visual Focus of Attention from Head Pose Estimation in Dynamic Multi-View Meeting Scenarios", *Proceedings of the 1oth International Conference on Multimodal Interfaces*, (Oct. 20, 2008), 8 pages.
Wedel, Michel et al., "Eye Fixations on Advertisements and Memory for Brands: A Model and Findings", *Journal of Marketing Science*, vol. 19, Issue 4, (Oct. 2000), pp. 297-312.
Wood, Orlando "Using Faces: Measuring Emotional Engagement for Early Stage Creative", *In ESOMAR, Best Methodology, Annual Congress*, (Sep. 19, 2007), 29 pages.
Zhang, Zhenqiu et al., "Head Pose Estimation in Seminar Room Using Multi View Face Detectors", *Proceedings of the 1st International Evaluation Conference on Classification of Events, Activities and Relationships*, (Mar. 30, 2006), 7 pages.
"Foreign Notice of Allowance", Canadian Application No. 2775700, (Jan. 3, 2013), 1 page.
"Foreign Office Action", Canadian Application No. 2775814, (Dec. 14, 2012), 3 pages.
"International Search Report and Written Opinion", Application No. PCT/US2012/034641, (Nov. 30, 2012), 9 pages.
"Non-Final Office Action", U.S. Appl. No. 12/794,406, (Sep. 14, 2012),17 pages.
"Non-Final Office Action", U.S. Appl. No. 13/025,180, (Apr. 5, 2013),17 pages.
"Non-Final Office Action", U.S. Appl. No. 13/309,589, (Dec. 18, 2012),10 pages.
"Non-Final Office Action", U.S. Appl. No. 13/439,284, (Feb. 25, 2013),31 pages.
"Non-Final Office Action", U.S. Appl. No. 13/441,228, (Mar. 20, 2013),12 pages.
"Notice of Allowance", U.S. Appl. No. 12/474,453, (Dec. 12, 2012), 8 pages.
"Restriction Requirement", U.S. Appl. No. 13/488,046, (May 2, 2013), 5 pages.
"Non-Final Office Action", U.S. Appl. No. 13/118,884, Dec. 3, 2013, 10 pages.
"Final Office Action", U.S. Appl. No. 13/488,046, Dec. 10, 2013, 12 pages.
"International Search Report and Written Opinion", Application No. PCT/US2013/035348, Sep. 25, 2013, 16 pages.
"Restriction Requirement", U.S. Appl. No. 13/114,359, Dec. 18, 2013, 6 pages.
"Final Office Action", U.S. Appl. No. 13/363,689, Feb. 11, 2014, 18 pages.
"Final Office Action", U.S. Appl. No. 13/439,284, Feb. 10, 2014, 15 pages.
"Final Office Action", U.S. Appl. No. 13/482,867, Feb. 21, 2014, 15 pages.
"International Search Report and Written Opinion", Application No. PCT/US2013/038710, Jan. 8, 2014, 18 pages.
"Non-Final Office Action", U.S. Appl. No. 13/411,859, Mar. 11, 2014, 13 pages.
"Non-Final Office Action", U.S. Appl. No. 13/488,046, Mar. 14, 2014, 11 pages.
"Non-Final Office Action", U.S. Appl. No. 13/866,699, Feb. 7, 2014, 15 pages.
"Notice of Allowance", U.S. Appl. No. 13/118,884, Feb. 4, 2014, 7 pages.
"Foreign Office Action", European Patent Application No. 12195349.1, (May 10, 2013), 5 pages.
"PCT Search Report and Written Opinion", Application No. PCT/US2013/035047, (Jul. 5, 2013),10 pages.
"Non-Final Office Action", U.S. Appl. No. 13/363,689, (Jul. 26, 2013),18 pages.

(56) References Cited

OTHER PUBLICATIONS

"Final Office Action", U.S. Appl. No. 13/441,228, (Sep. 11, 2013), 15 pages.
"Non-Final Office Action", U.S. Appl. No. 12/972,837, (Jun. 26, 2013), 10 pages.
"Notice of Allowance", U.S. Appl. No. 13/093,621, (Aug. 21, 2013), 7 pages.
"Notice of Allowance", U.S. Appl. No. 13/309,859, (Sep. 4, 2013), 7 pages.
"Restriction Requirement", U.S. Appl. No. 13/482,867, (Sep. 6, 2013), 6 pages.
"Restriction Requirement", U.S. Appl. No. 13/114,359, (Sep. 10, 2013), 6 pages.
"Corrected Notice of Allowance", U.S. Appl. No. 13/309,859, (Oct. 29, 2013), 3 pages.
"Notice of Allowance", U.S. Appl. No. 12/972,837, (Oct. 11, 2013), 10 pages.
"Response to Office Action", U.S. Appl. No. 12/794,406, (Jul. 22, 2013), 9 pages.
"Restriction Requirement", U.S. Appl. No. 13/039,024, (Oct. 1, 2013), 5 pages.
"Non-Final Office Action", U.S. Appl. No. 13/482,867, (Nov. 5, 2013), 13 pages.
"Non-Final Office Action", U.S. Appl. No. 13/439,284, (Nov. 8, 2013), 14 pages.
"Advisory Action", U.S. Appl. No. 13/025,180, Jul. 3, 2014, 3 pages.
"Final Office Action", U.S. Appl. No. 13/411,859, Aug. 8, 2014, 16 pages.
"International Search Report and Written Opinion", Application No. PCT/US2013/039591, Aug. 1, 2014, 10 pages.
"Non-Final Office Action", U.S. Appl. No. 13/331,886, Jun. 19, 2014, 18 pages.
"Non-Final Office Action", U.S. Appl. No. 13/363,689, Sep. 15, 2014, 21 pages.
"Non-Final Office Action", U.S. Appl. No. 13/488,046, Jul. 23, 2014, 12 pages.
"Non-Final Office Action", U.S. Appl. No. 14/108,008, Aug. 14, 2014, 16 pages.
"Notice of Allowance", U.S. Appl. No. 13/439,284, Jul. 21, 2014, 6 pages.
"Non-Final Office Action", U.S. Appl. No. 13/039,024, Apr. 7, 2014, 12 pages.
"Final Office Action", U.S. Appl. No.. 13/488,046, May 1, 2014, 12 pages.
"Final Office Action", U.S. Appl. No. 13/025,180, Mar. 14, 2014, 21 pages.
"Final Office Action", U.S. Appl. No. 12/794,406, Jun. 4, 2014, 14 pages.
"Foreign Office Action", CN Application No. 201110159923.8, May 22, 2014, 10 pages.
"Foreign Office Action", CN Application No. 201110159923.8, Sep. 2, 2013, 13 pages.
"Non-Final Office Action", U.S. Appl. No. 12/794,406, Sep. 6, 2013, 13 pages.
"Non-Final Office Action", U.S. Appl. No. 13/114,359, Oct. 20, 2014, 7 pages.
"Non-Final Office Action", U.S. Appl. No. 13/411,859, Nov. 5, 2014, 16 pages.
"Non-Final Office Action", U.S. Appl. No. 13/441,228, Oct. 2, 2014, 18 pages.
"Notice of Allowance", U.S. Appl. No. 13/482,867, Sep. 30, 2014, 17 pages.
"Notice of Allowance", U.S. Appl. No. 13/866,699, Sep. 17, 2014, 6 pages.
"Summons to Attend Oral Proceedings", EP Application No. 12194891.3, Sep. 17, 2014, 7 Pages.
"Summons to Attend Oral Proceedings", EP Application No. 12195349.1, Sep. 17, 2014, 7 Pages.
"Definition of "Subscribe"", Retrieved from <http://dictionary.reference.com/browse/subscribe?s=t> on Jan. 7, 2015, 5 pages.
"Definition of "Synchronize"", Retrieved from <http://dictionary.reference.com/browse/synchronize?s=t> on Jan. 7, 2015, 4 pages.
"Final Office Action", U.S. Appl. No. 13/039,024, Dec. 3, 2014, 14 pages.
"Final Office Action", U.S. Appl. No. 13/331,886, Jan. 7, 2015, 19 pages.
"Final Office Action", U.S. Appl. No. 13/488,046, Jan. 27, 2015, 13 pages.
"Final Office Action", U.S. Appl. No. 14/108,008, Feb. 3, 2015, 9 pages.
"Non-Final Office Action", U.S. Appl. No. 13/025,180, Jan. 15, 2015, 17 pages.
"Extended European Search Report", EP Application No. 13724078.4, May 13, 2015, 7 pages.
"Final Office Action", U.S. Appl. No. 13/114,359, Mar. 23, 2015, 12 pages.
"Final Office Action", U.S. Appl. No. 13/363,689, Apr. 24, 2015, 24 pages.
"Foreign Notice of Allowance", CN Application No. 201110159923.8, Dec. 2, 2014, 4 pages.
"Notice of Allowance", U.S. Appl. No. 12/794,406, Jan. 21, 2015, 11 pages.
"Notice of Allowance", U.S. Appl. No. 14/108,008, May 11, 2015, 6 pages.
"Final Office Action", U.S. Appl. No. 13/411,859, Jun. 3, 2015, 17 pages.
"Final Office Action", U.S. Appl. No. 13/025,180, Apr. 24, 2015, 18 pages.
"Final Office Action", U.S. Appl. No. 13/441,228, May 21, 2015, 21 pages.

* cited by examiner

DETERMINING AUDIENCE STATE OR INTEREST USING PASSIVE SENSOR DATA

BACKGROUND

Advertisers and media providers want to know how many people are watching a particular television show or other media program. Current approaches often compile handwritten logs recorded by a small fraction of the potential viewing public. Using these logs and statistical modeling, current approaches estimate a total number of viewers based on a number of the small fraction that logged that they viewed the program. By so doing, advertisers and media providers may agree to advertising costs for commercials played during the television show, as well as learn what kinds of shows people wish to watch.

SUMMARY

This document describes techniques and apparatuses for determining an audience's state or interest using passive sensor data. The techniques receive sensor data that measures an audience during presentation of a media program. This sensor data can be passively obtained, and thus not annoy audience members or introduce inaccuracies common when relying on members to record their attendance or reaction to a media program. The techniques, based on this sensor data, then determine a state or interest of the audience members during the media program. The techniques may determine multiple states of an audience member over the course of the media program, such as a member laughing, then clapping, and then looking away from the media program. The techniques may also or instead determine an audience member's interest in the media program, such as a viewer having a high interest by laughing during a comedy or staring quietly during a drama. Further, the techniques may determine viewers' states and interest at various points in a media program effective to enable analysis of portions of a media program.

This summary is provided to introduce simplified concepts for determining audience state or interest using passive sensor data, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for determining audience state or interest using passive sensor data are described with reference to the following drawings. The same numbers are used throughout the drawings to reference like features and components.

DETAILED DESCRIPTION

Overview

Figure 1:
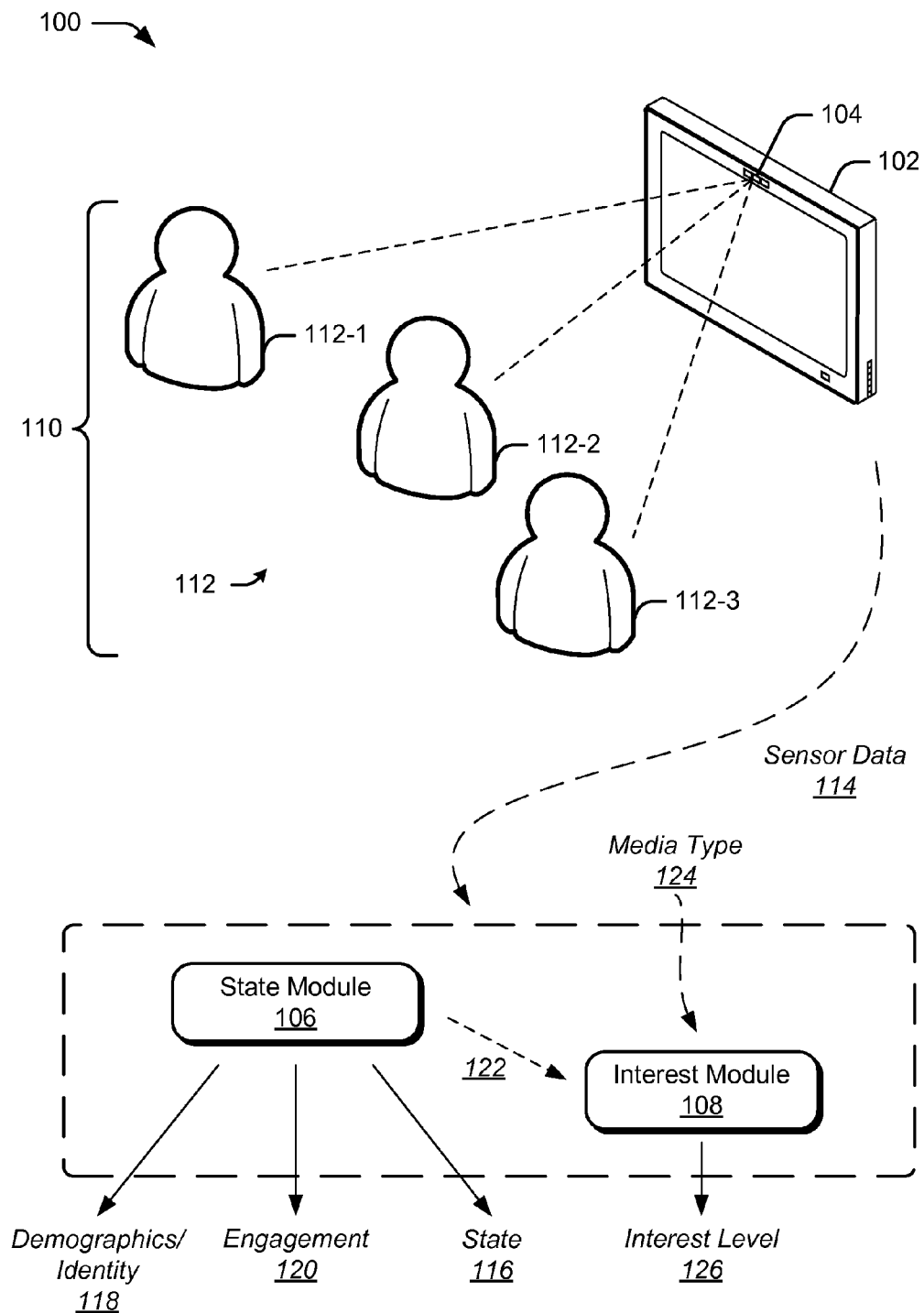
FIG. 1 illustrates an example environment in which techniques for determining audience state or interest using passive sensor data can be implemented.

This document describes techniques and apparatuses for determining audience state or interest using passive sensor data. By so doing, the techniques can determine not only that a viewer watched a media program, but what portions the viewer watched and how intently the viewer watched those portions, as well as a wealth of other valuable information.

Consider, for example, a 30-minute situational comedy, such as The Office, which is typically 22 minutes in total content with eight minutes of advertisements interspersed. Media providers, media creators, and advertisers would like to know how many people watched the program but also how viewers reacted to various parts of the program and the interspersed advertisements. For example, did many viewers laugh at a particular joke? Did they leave the room when a character in the show got into an embarrassing situation? Did they leave or stay for an advertisement? Did they watch an advertisement with interest (e.g., because they found it funny) or stay but ignore it?

The described techniques and apparatuses can provide answers to these questions by determining an audience's state or interest. Assume, for the above example, that two people are watching The Office in their home. The techniques can determine that the first person was present for all 30 minutes but did not pay attention to 7 of 16 total advertisements, laughed at minute 4, 13, and 19 of the 22 total minutes for the show, looked away and talked during minutes 15 and 16, and paid close attention and then cheered for an advertisement for a new adventure movie.

Similarly, the techniques can determine that the second person was not in the room until minute 3, left at minutes 12-15, was looking away and talking during minute 16, laughed at minutes 19 and 20, left for 9 of the 16 advertisements, and paid close attention to the new adventure movie advertisement and an advertisement for a women's clothing sale.

Based on this information, media providers, media creators, and advertisers can more-accurately price advertisements, determine future content likely to be well received (e.g., 80% of viewers laughed at the joke at minute 19, but only 10% laughed at the situation at minute 7, so future programs should include similar jokes but not similar situations), and determine future content of advertisements (e.g., the clothing-sale advertisement was well received by women in the audience, so structure future ads similarly).

This is but one example of how techniques and/or apparatuses for determining an audience's state or interest using passive sensor data can be performed. Techniques and/or apparatuses that determine an audience's state or interest using passive sensor data are referred to herein separately or in conjunction as the "techniques" as permitted by the context. This document now turns to an example environment in which the techniques can be embodied, after which various example methods for performing the techniques are described.

Example Environment

FIG. 1 is an illustration of an example environment 100 in which the techniques may determine an audience's state or interest using passive sensor data. Environment 100 includes a media presentation device 102, an audience-sensing device 104, a state module 106, and an interest module 108.

Media presentation device 102 presents a media program to an audience 110 having one or more persons 112. A media program can include, alone or in combination, a television show, a movie, a music video, a video clip, an advertisement, a blog, a web page, an e-book, a computer game, a song, a tweet, or other audio and/or video media. Audience 110 can include one or more multiple persons 112 that are in locations enabling consumption of a media program presented by media presentation device 102 and measurement by audience-sensing device 104. In audience 110 three persons are shown: 112-1, 112-2, and 112-3.

Audience-sensing device 104 is capable of passively sensing audience 110 and providing sensor data for audience 110 to state module 106 and/or interest module 108 (sensor data shown provided at arrow 114). In this context, sensor data is passive by not requiring active participation of persons in the measurement of those persons. Examples of active sensor data include data recorded by persons in an audience, such as with hand-written logs, active entry of a user's impressions through selection by the user of buttons on a remote control, and data sensed from users through biometric sensors worn by persons in the audience. Passive sensor data can include data sensed using emitted light or other signals sent by audience-sensing device 104, such as with an infrared sensor bouncing emitted infrared light off of persons or the audience space (e.g., a couch, walls, etc.) and sensing the light that returns. Examples of passive sensor data and ways in which it is measured are provided in greater detail below.

Audience-sensing device 104 may or may not process sensor data prior to providing it to state module 106 and/or interest module 108. Thus, sensor data may be or include raw data or processed data, such as: RGB (Red, Green, Blue) frames; infrared data frames; depth data; heart rate; respiration rate; a person's head orientation or movement (e.g., coordinates in three dimensions, x, y, z, and three angles, pitch, tilt, and yaw); facial (e.g., gaze of eyes, eyebrow, eyelid, nose, and mouth) orientation, movement, or occlusion; skeleton's orientation, movement, or occlusion; audio, which may include information indicating orientation sufficient to determine from which person the audio originated or directly indicating which person, or what words were said, if any; thermal readings sufficient to determine or indicating presence and locations of one of persons 112; and distance from the audience-sensing device 104 or media presentation device 102. In some cases audience-sensing device 104 includes infrared sensors (e.g., webcams, Kinect cameras), stereo microphones or directed audio microphones, eye-tracking sensors, and a thermal reader (in addition to infrared sensors), though other sensing apparatuses may also or instead be used.

State module 106 receives sensor data and determines, based on the sensor data, states of persons 112 in audience 110 (shown at arrow 116). States include, for example: sad, talking, disgusted, afraid, smiling, scowling, placid, surprised, angry, laughing, screaming, clapping, waving, cheering, looking away, looking toward, leaning away, leaning toward, asleep, or departed, to name just a few.

The talking state can be a general state indicating that a person is talking, though it may also include subcategories based on the content of the speech, such as talking about the media program (related talking) or talking that is unrelated to the media program (unrelated talking). State module 106 can determine which talking category through speech recognition.

State module 106 may also or instead determine, based on sensor data, a number of persons, a person's identity and/or demographic data (arrow 118), or engagement (arrow 120) during presentation. Identity indicates a unique identity for one of persons 112 in audience 110, such as Susan Brown. Demographic data classifies one of persons 112, such as 5 feet, 4 inches tall, young child, and male or female. Engagement indicates whether a person is likely to be paying attention to the media program, such as based on that person's presence or facial orientation. Engagement, in some cases, can be determined by state module 106 with lower-resolution or less-processed sensor data compared to that used to determine states. Even so, engagement can be useful in measuring an audience, whether on its own or to determine a person's interest using interest module 108.

Interest module 108 determines, based on sensor data (arrow 114) and/or a person's engagement or state (shown with dashed-line arrow 122) and information about the media program (shown at media type arrow 124), that person's interest level (arrow 126) in the media program. Interest module 108 may determine, for example, that multiple laughing states for a media program intended to be a serious drama indicate a low level of interest and conversely, that for a media program intended to be a comedy, that multiple laughing states indicate a high level of interest.

Figure 2:
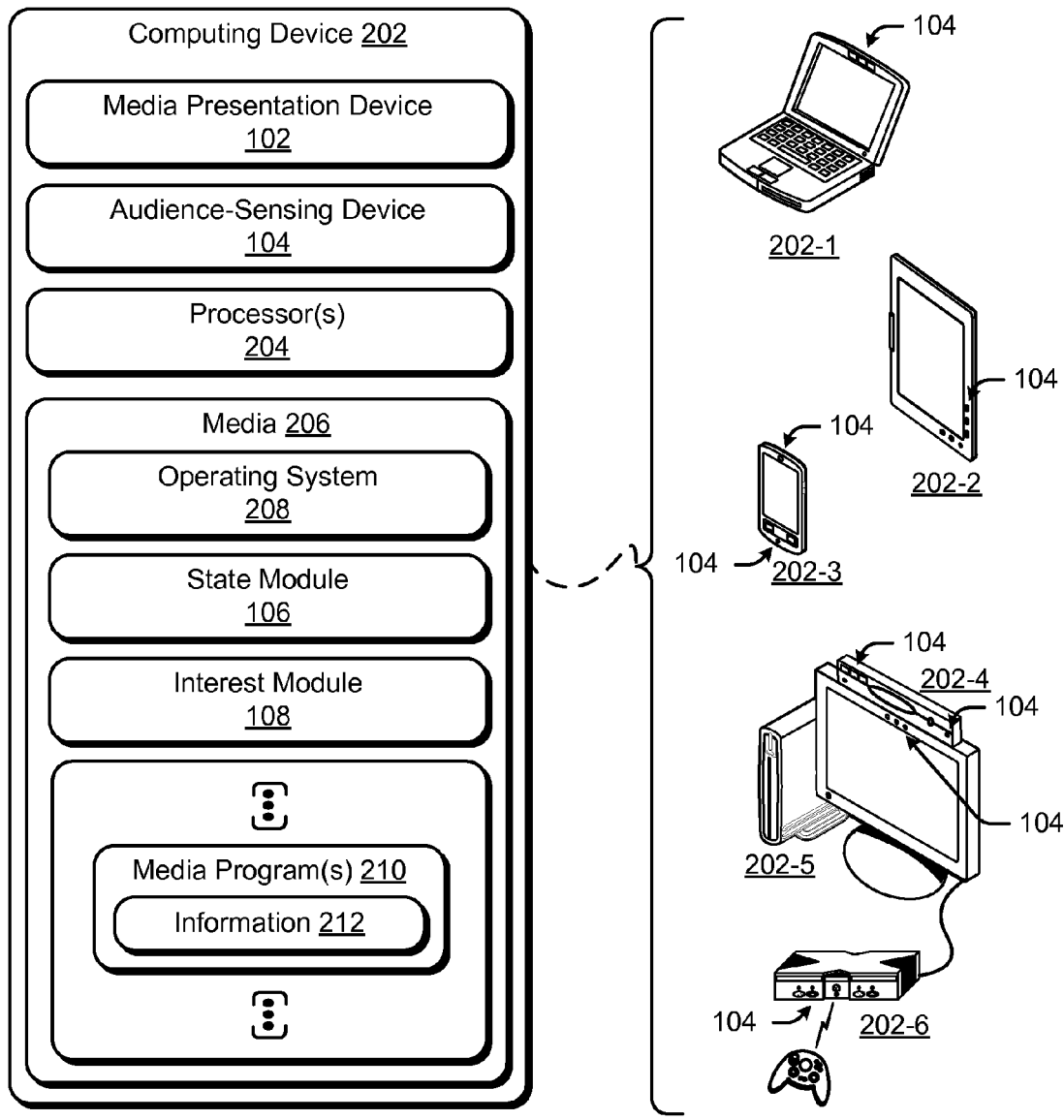
FIG. 2 is an illustration of an example computing device that is local to the audience of FIG. 1.

State module 106 and interest module 108 can be local to audience 110, and thus media presentation device 102 and audience-sensing device 104, though this is not required. An example embodiment where state module 106 and interest module 108 are local to audience 110 is shown in FIG. 2. In some cases, however, state module 106 and/or interest module 108 are remote from audience 110, which is illustrated in FIG. 3.

FIG. 2 is an illustration of an example computing device 202 that is local to audience 110. Computing device 202 includes or has access to media presentation device 102, audience-sensing device 104, one or more processors 204, and computer-readable storage media ("media") 206. Media 206 includes an operating system 208, state module 106, interest module 108, media program(s) 210, each of which may include or have associated program information 212. Note that in this illustrated example, media presentation device 102, audience-sensing device 104, state module 106, and interest module 108 are included within a single computing device, such as a desktop computer having a display, forward-facing camera, microphones, audio output, and the like. Each of these entities 102-108, however, may be separate from or integral with each other in one or multiple computing devices or otherwise. As will be described in part below, media presentation device 102 can be integral with audience-sensing device 104 but be separate from state module 106 or interest module 108.

As shown in FIG. 2, computing device(s) 202 can each be one or a combination of various devices, here illustrated with six examples: a laptop computer 202-1, a tablet computer 202-2, a smart phone 202-3, a set-top box 202-4, a desktop 202-5, and a gaming system 202-6, though other computing devices and systems, such as televisions with computing capabilities, netbooks, and cellular phones, may also be used. Note that three of these computing devices 202 include media presentation device 102 and audience-sensing device 104 (laptop computer 202-1, tablet computer 202-2, smart phone 202-3). One device excludes—but is in communication with—media presentation device 102 and audience-sensing device 104 (desktop 202-5). Two others exclude media presentation device 102 and may or may not include audience-sensing device 104, such as in cases where audience-sensing device 104 is included within media presentation device 102 (set-top box 202-4 and gaming system 202-6).

Figure 3:
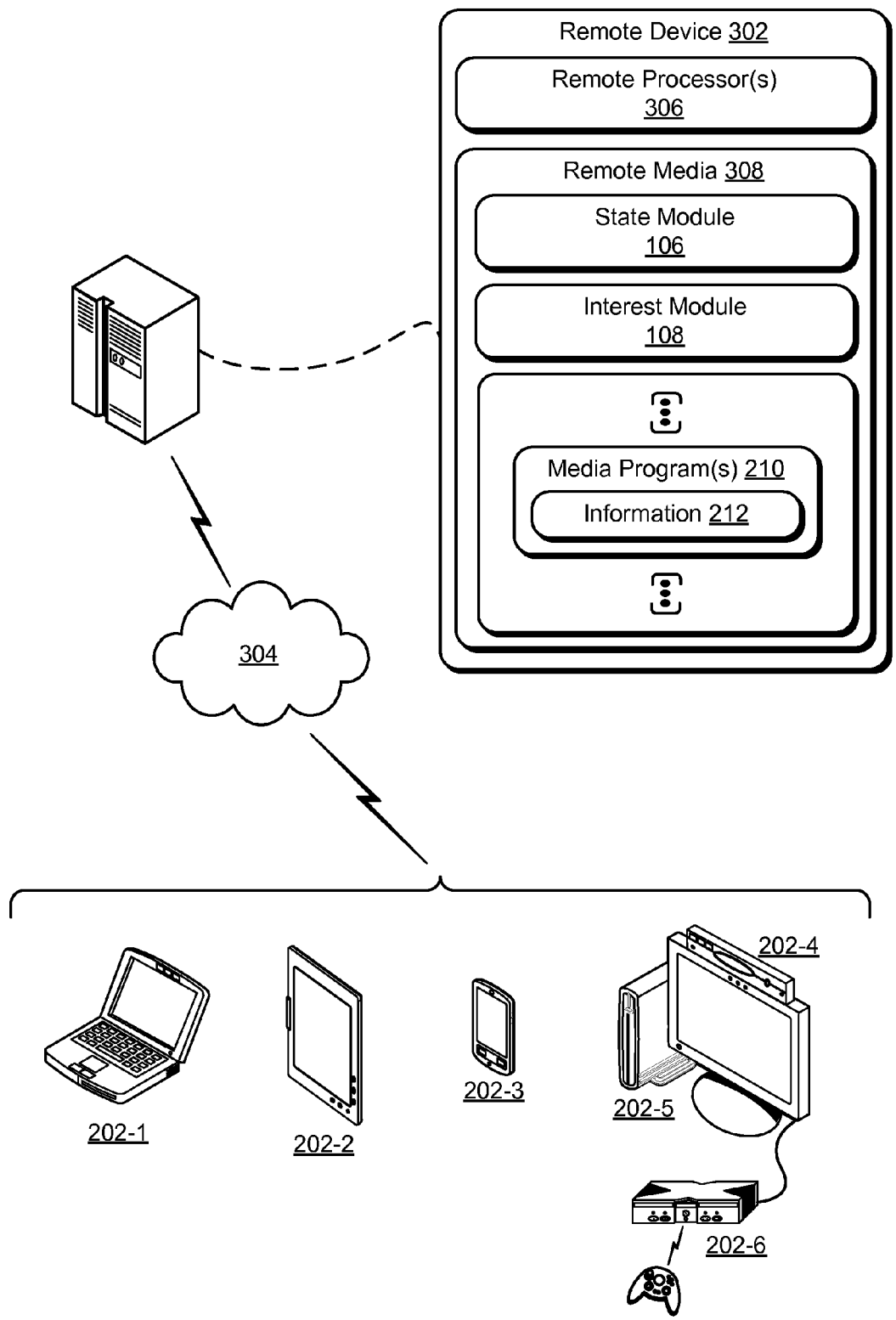
FIG. 3 is an illustration of an example remote computing device that is remote to the audience of FIG. 1, as well as a network through which the remote computing device communicates with the computing device of FIG. 2.

FIG. 3 is an illustration of an example remote computing device 302 that is remote to audience 110. FIG. 3 also illustrates a communications network 304 through which remote computing device 302 communicates with audience-sensing device 104 (not shown, but embodied within, or in communication with, computing device 202). Communication network 304 may be the Internet, a local-area network, a wide-area network, a wireless network, a USB hub, a computer bus, another mobile communications network, or a combination of these.

Remote computing device 302 includes one or more processors 306 and remote computer-readable storage media ("remote media") 308. Remote media 308 includes state module 106, interest module 108, and media program(s) 210, each of which may include or have associated program information 212. Note that in this illustrated example, media presentation device 102 and audience-sensing device 104 are physically separate from state module 106 and interest module 108, with the first two local to an audience viewing a media program and the second two operating remotely. Thus, as will be described in greater detail below, sensor data is passed from audience-sensing device 104 to one or both of state module 106 or interest module 108, which can be communicated locally (FIG. 2) or remotely (FIG. 3).

These and other capabilities, as well as ways in which entities of FIGS. 1-3 act and interact, are set forth in greater detail below. These entities may be further divided, combined, and so on. The environment 100 of FIG. 1 and the detailed illustrations of FIGS. 2 and 3 illustrate some of many possible environments capable of employing the described techniques.

Example Methods

Figure 4:
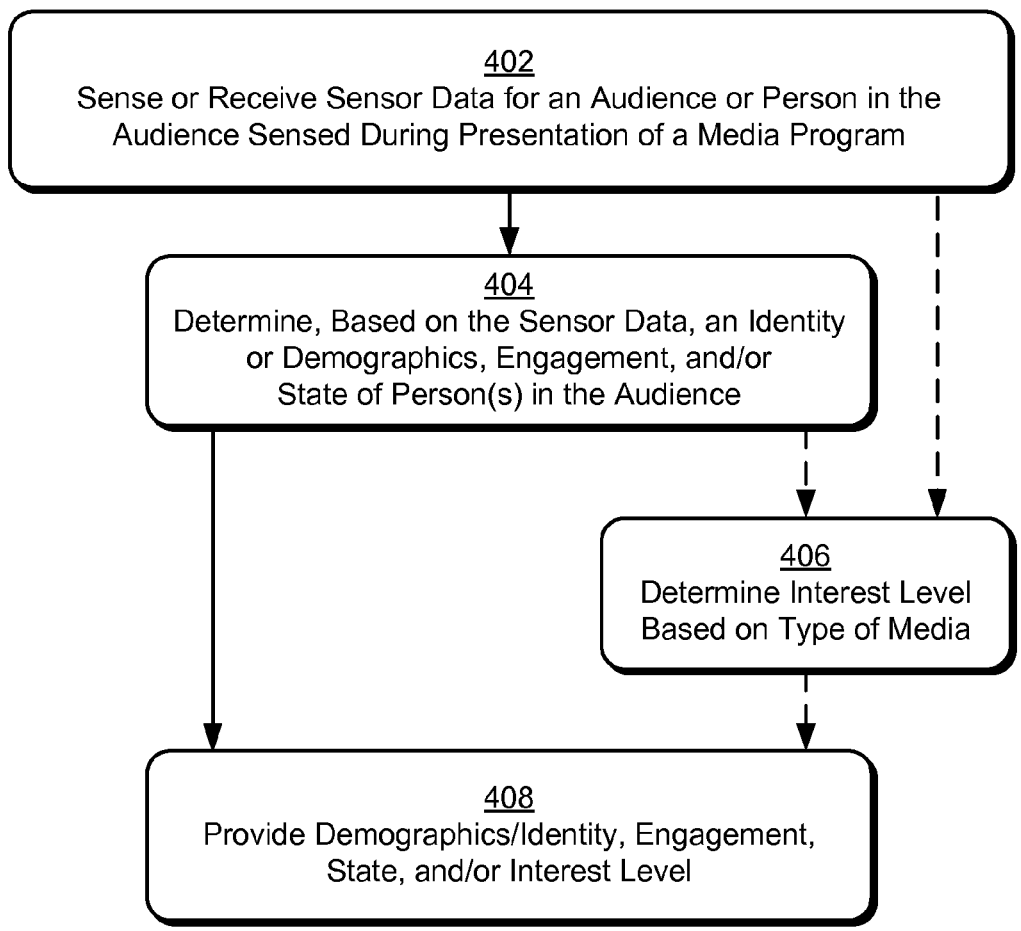
FIG. 4 illustrates example methods for determining audience state or interest using passive sensor data.

FIG. 4 depicts methods 400 for determining an audience's state or interest using passive sensor data. The methods of FIG. 4 are shown as sets of blocks that specify operations performed but are not necessarily limited to the order shown for performing the operations by the respective blocks. In portions of the following discussion reference may be made to environment 100 of FIG. 1 and entities detailed in FIGS. 2-3, reference to which is made for example only. The techniques are not limited to performance by one entity or multiple entities operating on one device.

Block 402 senses or receives sensor data for an audience or person, the sensor data passively sensed during presentation of a media program to the audience or person.

Consider, for example, a case where an audience includes three persons 112, persons 112-1, 112-2, and 112-3 all of FIG. 1. Assume that media presentation device 102 includes an LCD display and speakers through which the media program is rendered, and is in communication with set-top box 202-4 of FIG. 2. Here audience-sensing device 104 is a forward-facing high-resolution red-green-blue sensor, an infrared sensor, and two microphones capable of sensing sound and location, which is integral with set-top box 202-4 or media presentation device 102. Assume also that the media program 210 being presented is a PG-rated animated movie named Incredible Family, which is streamed from a remote source and through set-top box 202-4. Set-top box 202-4 presents Incredible Family with six advertisements, spaced one at the beginning of the movie, three in a three-ad block, and two in a two-ad block.

Sensor data is received for all three persons 112 in audience 110; for this example consider first person 112-1. Assume here that, over the course of Incredible Family, that audience-sensing device 104 measures, and then provides at block 402, the following at various times for person 112-1:

Time 1, head orientation 3 degrees, no or low-amplitude audio.
Time 2, head orientation 24 degrees, no audio.
Time 3, skeletal movement (arms), high-amplitude audio.
Time 4, skeletal movement (arms and body), high-amplitude audio.
Time 5, head movement, facial-feature changes, moderate-amplitude audio.
Time 6, detailed facial orientation data, no audio.
Time 7, skeletal orientation (missing), no audio.
Time 8, facial orientation, respiration rate.

Block 404 determines, based on the sensor data, a state of the person during the media program. In some cases block 404 determines a probability for the state or multiple probabilities for multiple states, respectively. For example, block 404 may determine a state likely to be correct but with less than full certainty (e.g., 90% chance that the person is laughing). Block 404 may also or instead determine that multiple states are possible based on the sensor data, such as a sad or placid state, and probabilities for each (e.g., sad state 65%, placid state 35%).

Block 404 may also or instead determine demographics, identity, and/or engagement. Further, methods 400 may skip block 404 and proceed directly to block 406, as described later below.

In the ongoing example, state module 106 receives the above-listed sensor data and determines the following corresponding states for person 112-1:

Time 1: Looking toward.
Time 2: Looking away.
Time 3: Clapping.
Time 4: Cheering.
Time 5: Laughing.
Time 6: Smiling.
Time 7: Departed.
Time 8: Asleep.

At Time 1 state module 106 determines, based on the sensor data indicating a 3-degree deviation of person 112-1's head from looking directly at the LCD display and a rule indicating that the looking toward state applies for deviations of less than 20 degrees (by way of example only), that person 112-1's state is looking toward. Similarly, at Time 2, state module 106 determines person 112-1 to be looking away due to the deviation being greater than 20 degrees.

At Time 3, state module 106 determines, based on sensor data indicating that person 112-1 has skeletal movement in his arms and audio that is high amplitude that person 112-1 is clapping. State module 106 may differentiate between clapping and other states, such as cheering, based on the type of arm movement (not indicated above for brevity). Similarly, at Time 4, state module 106 determines that person 112-1 is cheering due to arm movement and high-amplitude audio attributable to person 112-1.

At Time 5, state module 106 determines, based on sensor data indicating that person 112-1 has head movement, facial-feature changes, and moderate-amplitude audio, that person 112-1 is laughing. Various sensor data can be used to differentiate different states, such as screaming, based on the audio being moderate-amplitude rather than high-amplitude and the facial-feature changes, such as an opening of the mouth and a rising of both eyebrows.

For Time 6, audio-sensing device 104 processes raw sensor data to provide processed sensor data, and in this case facial recognition processing to provide detailed facial orientation data. In conjunction with no audio, state module 106 determines that the detailed facial orientation data (here upturned lip corners, amount of eyelids covering eyes) that person 112-1 is smiling.

At Time 7, state module 106 determines, based on sensor data indicating that person 112-1 has skeletal movement moving away from the audience-sensing device 104, that person 112-1 is departed. The sensor data may indicate this directly as well, such as in cases where audience-sensing device 104 does not sense person 112-1's presence, either through no skeletal or head readings or a thermal signature no longer being received.

At Time 8, state module 106 determines, based on sensor data indicating that person 112-1's facial orientation has not changed over a certain period (e.g., eyes have not blinked) and a steady, slow respiration rate that person 112-1 is asleep.

These eight sensor readings are simplified examples for purpose of explanation. Sensor data may include extensive data as noted elsewhere herein. Further, sensor data may be received measuring an audience every fraction of a second, thereby providing detailed data for tens, hundreds, and thousands of periods during presentation of a media program and from which states may be determined.

Returning to methods 400, block 404 may determine demographics, identity, and engagement in addition to a person's state. State module 106 may determine or receive sensor data from which to determine demographics and identity or receive, from audience-sensing device 104, the demographics or identity. Continuing the ongoing example, the sensor data for person 112-1 may indicate that person 112-1 is John Brown, that person 112-2 is Lydia Brown, and that person 112-3 is Susan Brown, for example. Or sensor data may indicate that person 112-1 is six feet, four inches tall and male (based on skeletal orientation), for example. The sensor data may be received with or include information indicating portions of the sensor data attributable separately to each person in the audience. In this present example, however, assume that audience-sensing device 104 provides three sets of sensor data, with each set indicating the identity of the person along with the sensor data.

Also at block 404, the techniques may determine an engagement of an audience or person in the audience. As noted, this determination can be less refined than that of states of a person, but nonetheless is useful. Assume for the above example, that sensor data is received for person 112-2 (Lydia Brown), and that this sensor data includes only head and skeletal orientation:

Time 1, head orientation 0 degrees, skeletal orientation upper torso forward of lower torso.
Time 2, head orientation 2 degrees, skeletal orientation upper torso forward of lower torso.
Time 3, head orientation 5 degrees, skeletal orientation upper torso approximately even with lower torso.
Time 4, head orientation 2 degrees, skeletal orientation upper torso back from lower torso.
Time 5, head orientation 16 degrees, skeletal orientation upper torso back from lower torso.
Time 6, head orientation 37 degrees, skeletal orientation upper torso back from lower torso.
Time 7, head orientation 5 degrees, skeletal orientation upper torso forward of lower torso.
Time 8, head orientation 1 degree, skeletal orientation upper torso forward of lower torso.

State module 106 receives this sensor data and determines the following corresponding engagement for Lydia Brown:
Time 1: Engagement High.
Time 2: Engagement High.
Time 3: Engagement Medium-High.
Time 4: Engagement Medium.
Time 5: Engagement Medium-Low.
Time 6: Engagement Low.
Time 7: Engagement High.
Time 8: Engagement High.

At Times 1, 2, 7, and 8, state module 106 determines, based on the sensor data indicating a 5-degree-or-less deviation of person 112-2's head from looking directly at the LCD display and skeletal orientation of upper torso forward of lower torso (indicating that Lydia is leaning forward to the media presentation) that Lydia is highly engaged in Incredible Family at these times.

At Time 3, state module 106 determines that Lydia's engagement level has fallen due to Lydia no longer leaning forward. At Time 4, state module 106 determines that Lydia's engagement has fallen further to medium based on Lydia leaning back, even though she is still looking almost directly at Incredible Family.

At Times 5 and 6, state module 106 determines Lydia is less engaged, falling to Medium-Low and then Low engagement based on Lydia still leaning back and looking slightly away (16 degrees) and then significantly away (37 degrees), respectively. Note that at Time 7 Lydia quickly returns to a High engagement, which media creators are likely interested in, as it indicates content found to be exciting or otherwise captivating.

Methods 400 may proceed directly from block 402 to block 406, or from block 404 to block 406 or block 408. If proceeding to block 406 from block 404, the techniques determine an interest level based on the type of media being presented and the person's engagement or state. If proceeding to block 406 from block 402, the techniques determine an interest level based on the type of media being presented and the person's sensor data, without necessarily first or independently determining the person's engagement or state.

Continuing the above examples for persons 112-1 and 112-2, assume that block 406 receives states determined by state module 106 at block 404 for person 112-1 (John Brown). Based on the states for John Brown and information about the media program, interest module 108 determines an interest level, either overall or over time, for Incredible Family. Assume here that Incredible Family is both an adventure and a comedy program, with portions of the movie marked as having either of these media types. While simplified, assume that Times 1 and 2 are marked as comedy, Times 3 and 4 are marked as adventure, Times 5 and 6 are marked as comedy, and that Times 7 and 8 are marked as adventure. Revisiting the states determined by state module 106, consider the following again:
Time 1: Looking toward.
Time 2: Looking away.
Time 3: Clapping.
Time 4: Cheering.
Time 5: Laughing.
Time 6: Smiling.
Time 7: Departed.
Time 8: Asleep.

Based on these states, state module 106 determines for Time 1 that John Brown has a medium-low interest in the content at Time 1—if this were of an adventure or drama type, state module 106 may determine John Brown to instead be highly interested. Here, however, due to the content being comedy and thus intended to elicit laughter or a similar state, interest module 108 determines that John Brown has a medium-low interest at Time 1. Similarly, for Time 2, interest module 108 determines that John Brown has a low interest at Time 2 because his state is not only not laughing or smiling but is looking away.

At Times 3 and 4, interest module 108 determines, based on the adventure type for these times and states of clapping and cheering, that John Brown has a high interest level. At time 6, based on the comedy type and John Brown smiling, that he has a medium interest at this time.

At Times 7 and 8, interest module 108 determines that John Brown has a very low interest. Here the media type is adventure, though in this case interest module 108 would determine John Brown's interest level to be very low for most types of content.

As can be readily seen, advertisers, media providers, and media creators can benefit from knowing a person's interest level. Here assume that the interest level is provided over time for Incredible Family, along with demographic information about John Brown. With this information from numerous demographically similar persons, a media creator may learn that male adults are interested in some of the adventure content but that most of the comedy portions are not interesting.

Figure 5:
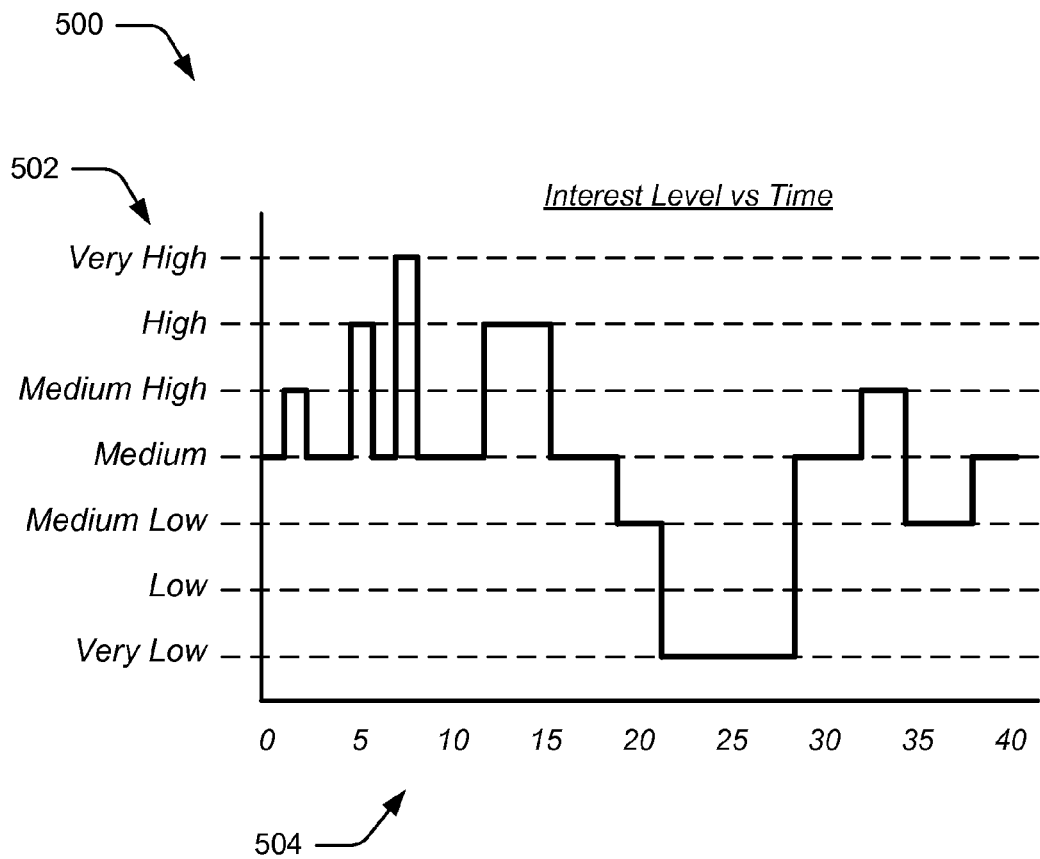
FIG. 5 illustrates an interest graph having interest levels for one person over forty time periods during presentation of a media program.

Consider, by way of a more-detailed example, FIG. 5, which illustrates an interest graph 500 having interest levels 502 for forty time periods 504 over a portion of a media program. Here assume that the media program is a movie that includes other media programs—advertisements—at time periods 18 to 30. Interest module 108 determines, as shown, that the person begins with a medium interest level, and then bounces between medium and medium-high, high, and very high interest levels to time period 18. During the first advertisement, which covers time periods 18-22, interest module 108 determines that the person has a medium low interest level. For time periods 23 to 28, however, interest module 108 determines that the person has a very low interest level (because he is looking away and talking or left the room, for example). For the last advertisement, which covers time period 28 to 32, however, interest module 108 determines that the person has a medium interest level for time periods 29 to 32—most of the advertisement. This can be valuable information—the person stayed for the first advertisement, left for the middle advertisement and the beginning of the last advertisement, and returned, with medium interest, for most of the last advertisement. Contrast this resolution and accuracy of interest with some conventional approaches, which likely would provide no information about how many of the people that watched the movie actually watched the advertisements, which ones, and with what amount of interest. If this is a common trend with the viewing public, prices for advertisements in the middle of a block would go down, and other advertisement prices would be adjusted as well. Or, advertisers and media providers might learn to play shorter advertisement blocks having only two advertisements, for example. Interest levels 502 also provide valuable information about portions of the movie itself, such as through the very high interest level at time period 7 and the waning interest at time periods 35-38.

Note that, in some cases, engagement levels, while useful, may be less useful or accurate than states and interest levels. For example, state module 106 may determine, for just engagement levels, that a person is not engaged if the person's face is occluded (blocked) and thus not looking at the media program. If the person's face is blocked by that person's hands (skeletal orientation) and audio indicates high-volume audio, state module 106, when determining states, may determine the person to be screaming. A screaming state indicates, in conjunction with the content being horror or suspense, an interest level that is very high. This is but one example of where an interest level can be markedly different from that of an engagement level.

As noted above, methods 400 may proceed directly from block 402 to block 406. In such a case, interest module 108, either alone or in conjunction with state module 106, determines an interest level based on the type of media (including multiple media types for different portions of a media program) and the sensor data. By way of example, interest module 108 may determine that for sensor data for John Brown at Time 4, which indicates skeletal movement (arms and body), and high-amplitude audio, and a comedy, athletics, conflict-based talk show, adventure-based video game, tweet, or horror types, that John Brown has a high interest level at Time 4. Conversely, interest module 108 may determine that for the same sensor data at Time 4 for a drama, melodrama, or classical music, that John Brown has a low interest level at Time 4. This can be performed based on the sensor data without first determining an engagement level or state, though this may also be performed.

Block 408, either after block 404 or 406, provides the demographics, identity, engagement, state, and/or interest level. State module 106 or interest module 108 may provide this information to various entities. These entities can be any of the above-mentioned advertisers, media creators, and media providers. Providing this information to an advertising entity or media provider can be effective to enable the advertising entity to measure a value of their advertisements shown during a media program or the media provider to set advertisement costs. Providing this information to a media creator can be effective to enable the media creator to assess a potential value of a similar media program or portion thereof. For example, a media creator, prior to releasing the media program to the general public, may determine portions of the media program that are not well received, and thus alter the media program to improve it.

Further, this information may be provided to other entities as well. Providing this information to a rating entity, for example, can be effective to enable the rating entity to automatically rate the media program for the person (e.g., four stars out of five or a "thumbs up"). Providing this information to a media controller, for example, may enable the media controller to improve media control and presentation, such as by pausing the media program responsive to all of the persons in the audience departing the MOM.

As noted herein, the techniques can determine numerous states for a person over the course of most media programs, even for 15-second advertisements or video snippets. In such a case block 404 is repeated, such as at one-second periods.

Furthermore, state module 106 may determine not only multiple states for a person over time, but also various different states at a particular time. A person may be both laughing and looking away, for example, both of which are states that may be determined and provided or used to determine the persons' interest level.

Further still, either or both of state module 106 and interest module 108 may determine engagement, states, and/or interest levels based on historical data in addition to sensor data or media type. In one case a person's historical sensor data is used to normalize the person's engagement, states, or interest levels. If, for example, Susan Brown is viewing a media program and sensor data for her is received, the techniques may normalize or otherwise learn how best to determine engagement, states, and interest levels for her based on her historical sensor data. If Susan Brown's historical sensor data indicates that she is not a particularly expressive or vocal person, the techniques may adjust for this history. Thus, lower-amplitude audio may be sufficient to determine that Susan Brown laughed compared to an amplitude of audio used to determine that a typical person laughed.

In another case historical engagement, states, or interest levels of the person for which sensor data is received are compared with historical engagement, states, or interest levels for other people. Thus, a lower interest level may be determined for Lydia Brown based on data indicating that she exhibits a high interest for almost every media program she watches compared to other people's interest levels (either generally or for the same media program). In either of these cases the techniques learn over time, and thereby can normalize engagement, states, and/or interest levels.

The preceding discussion describes methods relating to determining an audience's state or interest using passive sensor data. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1-3 and 6 (device 600 is described below), which may be further divided, combined, and so on. Thus, these figures illustrate some of many possible systems or apparatuses capable of employing the described techniques. The entities of these figures generally represent software, firmware, hardware, whole devices or networks, or a combination thereof. In the case of a software implementation, for instance, the entities (e.g., state module 106 and interest module 108) represent program code that performs specified tasks when executed on a processor (e.g., processor(s) 204 and/or 306). The program code can be stored in one or more computer-readable memory devices, such as media 206 and/or 308 or computer-readable media 614 of FIG. 6.

Example Device

Figure 6:
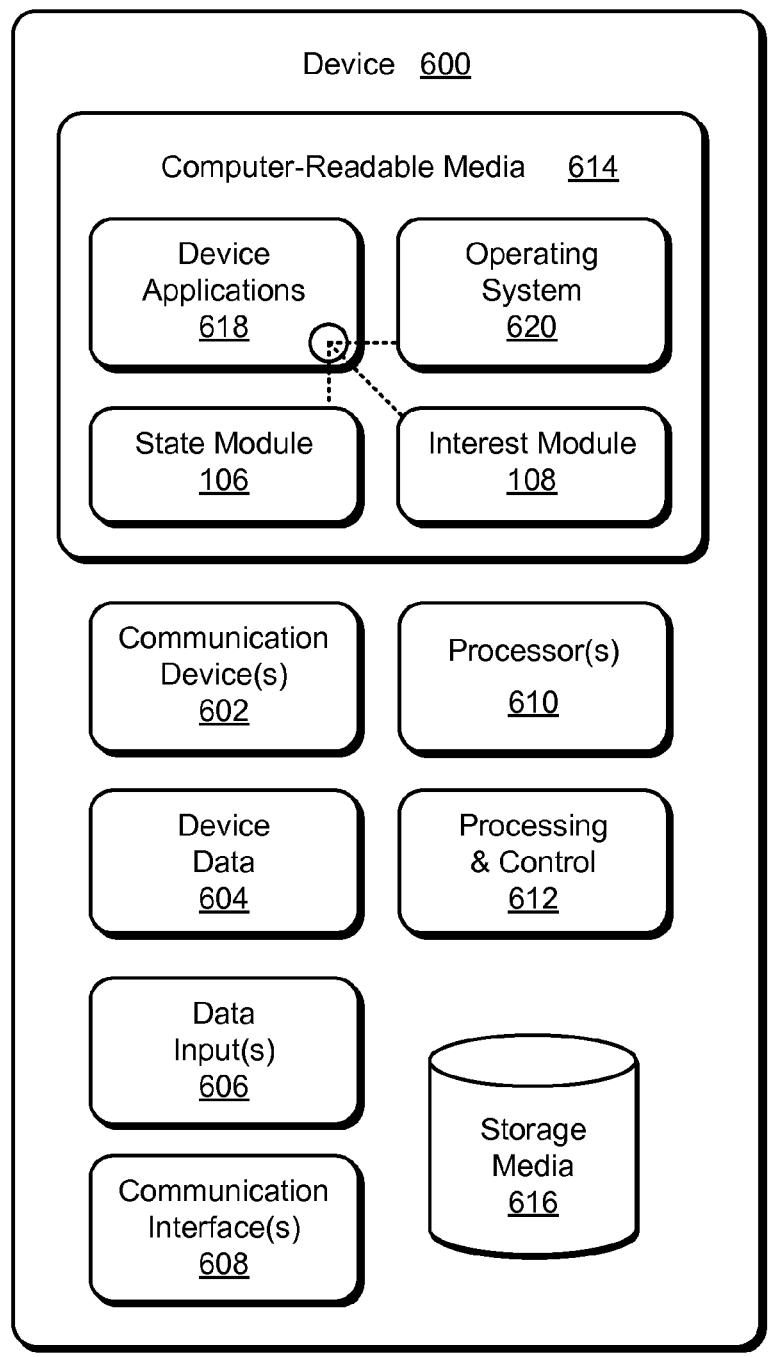
FIG. 6 illustrates an example device in which techniques for determining audience state or interest using passive sensor data can be implemented.

FIG. 6 illustrates various components of example device 600 that can be implemented as any type of client, server, and/or computing device as described with reference to the previous FIGS. 1-5 to implement techniques for determining audience state or interest using passive sensor data. In embodiments, device 600 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device. Device 600 may also be associated with a user (e.g., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device (e.g., media programs 210), and/or information associated with a user of the device. Media content stored on device 600 can include any type of audio, video, and/or image data. Device 600 includes one or more data inputs 606 via which any type of data, media content, and/or inputs can be received, such as human utterances, user-selectable inputs, messages, music, television media content, recorded video content, and any other type of audio, video, and/or image data received from any content and/or data source.

Device 600 also includes communication interfaces 608, which can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like), which process various computer-executable instructions to control the operation of device 600 and to enable techniques for determining audience state or interest using passive sensor data. Alternatively or in addition, device 600 can be implemented with any one or combination of hardware, firmware, or fixed logic circuitry that is implemented in connection with processing and control circuits, which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable storage media 614 provides data storage mechanisms to store the device data 604, as well as various device applications 618 and any other types of information and/or data related to operational aspects of device 600. For example, an operating system 620 can be maintained as a computer application with the computer-readable storage media 614 and executed on processors 610. The device applications 618 may include a device manager, such as any form of a control application, software application, signal-processing and control module, code that is native to a particular device, a hardware abstraction layer for a particular device, and so on.

The device applications 618 also include any system components, engines, or modules to implement techniques for determining audience state or interest using passive sensor data. In this example, the device applications 618 can include state module 106 and interest module 108.

CONCLUSION

Although embodiments of techniques and apparatuses for determining an audience's state or interest using passive sensor data have been described in language specific to features and/or methods, it is to be understood that the subject of the appended claims is not necessarily limited to the specific features or methods described. Rather, the specific features and methods are disclosed as example implementations for determining an audience's state or interest using passive sensor data.

What is claimed is:

1. A system comprising:
   one or more processors; and
   one or more memories storing instructions that, response to execution by the one or more processors, cause the one or more processors to perform operations comprising:
      receiving a media type describing a particular portion of a media program;
      receiving sensor data for a person, the sensor data passively sensed during presentation of the media program to the person;
      determining, based on the sensor data, a state of the person during the particular portion of the media program, the state being a sad, a related talking, an unrelated talking, a disgusted, an afraid, a smiling, a scowling, a placid, a surprised, an angry, a laughing, a screaming, a clapping, a waving, a cheering, a looking-away, a looking-toward, a leaning-away, a leaning-toward, an asleep, or a departed state;
      adjusting the determined state based, at least in part, on historical sensor data;
      responsive to the adjusting, deriving an interest level graph based, at least in part, on the determined state of the person during the particular portion of the media program; and
      providing the interest level graph and the media type describing the particular portion of the media program effective to enable measurement of a value of the media program, assessment of a potential value of a similar media program or portion thereof, control of presentation of the media program, or automatic rating, for the person, of the media program.

2. A system as described in claim 1, wherein the sensor data includes a head orientation of the person and the operation of determining the state determines the state to be the looking-away or the looking-toward state.

3. A system as described in claim 1, wherein the operation of determining the state of the person determines a numerical probability for the state or multiple numerical probabilities for multiple states, respectively.

4. A system as described in claim 1, wherein:
   the sensor data includes infrared data frames and the operation of determining the state determines the state based on the infrared data frames;
   the sensor data includes skeletal movement of the person and the operation of determining the state determines the state to be the clapping state;
   the sensor data includes skeletal movement of the person and no or low-amplitude audio of the person and the operation of determining the state determines the state to be the waving state;
   the sensor data includes skeletal orientation or movement of the person and high-amplitude audio from the person and the operation of determining the state determines the state to be the cheering state;
   the sensor data includes head movement of the person, facial movement or orientation of the person, and high-amplitude audio from the person and the operation of determining the state determines the state to be the laughing state or the screaming state;
   the sensor data includes facial orientation of the person and the operation of determining the state determines the state to be the sad, disgusted, afraid, smiling, placid, scowling, surprised, or angry state;
   the sensor data includes skeletal movement or a thermal reading of the person and the operation of determining the state determines the state to be the departed state;
   the sensor data includes audio and the operation of determining the state determines, using speech recognition, the state to be the related talking state or the unrelated talking state; or the sensor data includes facial orientation or respiration rate of the person and the operation of determining determines the state to be the asleep state.

5. A system as described in claim 1, wherein the sensor data is received for multiple periods during the presentation of additional portions of the media program, the operation of determining determines states for each of the multiple periods, and the operations further comprising providing the states for each of the multiple periods.

6. A system as described in claim 1, the operations further comprising determining, based on the sensor data, an identity of the person and providing the identity of the person.

7. A system as described in claim 1, the operations further comprising determining, based on the sensor data, a demographic of the person and providing the demographic of the person.

8. A system as described in claim 1, the operations further comprising determining, based on the media type and the state, an interest level of the person relative to the particular portion of the media program.

9. A computer-implemented method comprising:
   receiving sensor data for an audience, the sensor data passively sensed during presentation of a media program to the audience;
   determining, based on a media type describing a particular portion of the media program and the sensor data for the audience passively sensed during the presentation of the particular portion of the media program to the audience, an interest level of the audience to the particular portion of the media program;
   normalizing the determined interest level of the audience based on historical interest levels for a person in the audience;
   producing an interest level graph that indicates the determined and normalized interest level of the audience to the particular portion of the media program; and
   providing the interest level graph of the audience, the interest level graph indicating a value of the media program, usable to assess a potential value of a similar media program or portion thereof, usable to control presentation of the media program, or indicating a rating for the media program.

10. A computer-implemented method as described in claim 9, wherein the normalizing the determined interest level of the audience is further based on historical interest levels for other persons not in the audience.

11. A computer-implemented method as described in claim 9, further comprising determining, based on the sensor data, an engagement of the audience to the particular portion of the media program, and where determining the interest level of the audience is based on the engagement of the audience and the media type.

12. A computer-implemented method as described in claim 9, further comprising determining, based on the sensor data, states of one or more persons in the audience during presentation of the particular portion of the media program, and wherein the determining the interest level of the audience is based on the states of the one or more persons and the media type.

13. A computer-implemented method as described in claim 9, wherein the sensor data for the audience includes multiple sensor readings over a time in which the media program is presented to the audience and determining the interest level of the audience determines multiple interest levels over the time.

14. A computer-implemented method as described in claim 9, wherein the sensor data is received from an audience-sensing device local to the audience.

15. A computer-implemented method as described in claim 14, wherein the audience-sensing device is a forward-facing camera integrated within a display on which the media program is rendered.

16. A computer-implemented method as described in claim 15, wherein the forward-facing camera is capable of sensing facial orientation and skeletal movement of the audience, and the sensor data includes facial orientation data and skeletal movement data for a person in the audience, the skeletal movement including movement of an arm of the person.

17. A computer-implemented method as described in claim 14, wherein the audience-sensing device includes a microphone capable of sensing audio generated by the audience and a location of the audio relative to persons in the audience.

18. A computer-implemented method as described in claim 9, wherein the audience includes two or more persons and the sensor data is received with or includes information indicating portions of the sensor data attributable separately to each of the two or more persons.

19. A computer-implemented method as described in claim 9, the method performed by a System-on-Chip (SoC) integrated within a media presentation device that presents the media program to the audience, the media presentation device including an audience-sensing device from which the sensor data is received.

20. A computer-implemented method comprising:
passively sensing or receiving sensor data for an audience, the sensor data passively sensed at time periods during which a media program is presented to the audience and from an audience-sensing device capable of sensing head or skeletal orientation or movement, the sensor data including the head or skeletal orientation or movement;
determining, based on the sensor data, multiple states of at least one person in the audience for the time periods during which the media program is presented to the audience;
normalizing one of the determined multiple states based, at least in part, on historical sensor data for the at least one person in the audience;
receiving one or more media types describing respective portions included in the media program;
determining, based on the one or more media types describing respective portions included in the media program and the multiple states of the person in the audience, multiple interest levels of the person for the time periods;
generating an interest graph that includes the determined multiple interest levels of the person for the time periods; and
providing the interest graph to an advertising entity effective to enable the advertising entity to measure a value of the media program, a media creator effective to enable the media creator to assess a potential value of a similar media program, a controller effective to enable the controller to control presentation of the media program, or a rating entity effective to enable the rating entity to automatically rate the media program for the person.

* * * * *